United States Patent
Lim et al.

(10) Patent No.: US 12,405,405 B2
(45) Date of Patent: Sep. 2, 2025

(54) OPTICAL IMAGING SYSTEM

(71) Applicant: SAMSUNG ELECTRO-MECHANICS CO., LTD., Suwon-si (KR)

(72) Inventors: Tae Yeon Lim, Suwon-si (KR); Hag Chul Kim, Suwon-si (KR); Phil Ho Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1071 days.

(21) Appl. No.: 17/365,062

(22) Filed: Jul. 1, 2021

(65) Prior Publication Data
US 2022/0268971 A1     Aug. 25, 2022

(30) Foreign Application Priority Data

Feb. 19, 2021   (KR) .................. 10-2021-0022588

(51) Int. Cl.
*G02B 3/14*   (2006.01)
*G02B 9/62*   (2006.01)
*G02B 13/00*  (2006.01)

(52) U.S. Cl.
CPC ............. *G02B 3/14* (2013.01); *G02B 9/62* (2013.01); *G02B 13/0045* (2013.01); *G02B 13/0065* (2013.01); *G02B 13/009* (2013.01)

(58) Field of Classification Search
CPC .......... G02B 13/009; G02B 9/62–9/64; G02B 3/12–3/14
USPC ....................................... 359/713, 757, 666
See application file for complete search history.

(56) References Cited

U.S. PATENT DOCUMENTS

| | | | |
|---|---|---|---|
| 7,375,898 B2* | 5/2008 | Kohno | G02B 26/005 359/666 |
| 10,203,514 B2 | 2/2019 | Ohno | |
| 10,921,552 B1* | 2/2021 | Park | G02B 7/182 |
| 11,693,221 B2* | 7/2023 | Chen | H04N 23/51 348/344 |
| 12,055,698 B2* | 8/2024 | Chang | G02B 27/0012 |
| 12,081,857 B2* | 9/2024 | Chang | G02B 27/646 |
| 2005/0030651 A1 | 2/2005 | Sekiyama | |

(Continued)

FOREIGN PATENT DOCUMENTS

| | | |
|---|---|---|
| CN | 102341737 A | 2/2012 |
| CN | 107493409 A | 12/2017 |

(Continued)

OTHER PUBLICATIONS

Chinese Office Action issued on Mar. 21, 2024, in counterpart Chinese Patent Application No. 202110994091.5 (4 pages in English, 6 pages in Chinese).

(Continued)

*Primary Examiner* — Zachary W Wilkes
(74) *Attorney, Agent, or Firm* — NSIP Law

(57) ABSTRACT

An optical imaging system includes a plurality of fixed lenses disposed along an optical axis; a first reflective member disposed on an object side of the plurality of lenses; and a plurality of reflective members disposed on an image side of the plurality of lenses. At least one of the plurality of lenses is a variable lens having a variable focal length, and each of the plurality of reflective members is configured to move as the focal length of the variable lens changes.

17 Claims, 21 Drawing Sheets

TTL1=a+b+c

(56) References Cited

U.S. PATENT DOCUMENTS

| | | | |
|---|---|---|---|
| 2006/0017834 A1* | 1/2006 | Konno | G02B 13/0065 348/335 |
| 2007/0024739 A1* | 2/2007 | Konno | G02B 13/002 348/337 |
| 2007/0236802 A1* | 10/2007 | Kohno | G02B 26/005 359/665 |
| 2007/0247727 A1* | 10/2007 | Kim | G02B 3/14 359/689 |
| 2009/0185281 A1* | 7/2009 | Hendriks | G02B 26/005 359/666 |
| 2012/0026384 A1 | 2/2012 | Yamada | |
| 2015/0028195 A1* | 1/2015 | King | B29D 11/00461 156/308.2 |
| 2017/0276954 A1 | 9/2017 | Bajorins et al. | |
| 2019/0094497 A1 | 3/2019 | Huang | |
| 2020/0271435 A1 | 8/2020 | Van Der Valk | |
| 2021/0048629 A1 | 2/2021 | Kuo | |
| 2021/0116682 A1* | 4/2021 | Smolka | G02B 13/12 |
| 2021/0199930 A1* | 7/2021 | Chen | G03B 5/00 |
| 2022/0026691 A1* | 1/2022 | Chang | G02B 15/1455 |
| 2022/0043190 A1 | 2/2022 | Kwon | |

FOREIGN PATENT DOCUMENTS

| | | | |
|---|---|---|---|
| CN | 110879454 A | | 3/2020 |
| CN | 112637467 A | * | 4/2021 |
| JP | H06-194560 A | | 7/1994 |
| JP | 2006-171449 A | | 6/2006 |
| JP | WO2018/066675 A1 | | 4/2018 |
| KR | 10-2020-0072256 A | | 6/2020 |
| KR | 10-2020-0085674 A | | 7/2020 |
| TW | 201632949 A | | 9/2016 |

OTHER PUBLICATIONS

Korean Office Action Issued on Feb. 10, 2023, in counterpart Korean Patent Application No. 10-2021-0022588 (6 Pages in English, 4 Pages in Korean).

Taiwanese Office Action issued on Feb. 9, 2022, in counterpart Taiwanese Patent Application No. 110125136 (5 pages in English and 5 pages in Mandarin).

* cited by examiner

TTL1=a+b+c

OPTICAL IMAGING SYSTEM

CROSS-REFERENCE TO RELATED APPLICATION(S)

This application claims the benefit under 35 USC 119(a) of Korean Patent Application No. 10-2021-0022588 filed on Feb. 19, 2021 in the Korean Intellectual Property Office, the entire disclosure of which is incorporated herein by reference for all purposes.

BACKGROUND

1. Field

The following description relates to an optical imaging system.

2. Description of Background

Recently, a camera module has been employed in portable electronic devices including smartphones.

Also, to indirectly implement an optical zoom effect, a method of mounting a plurality of camera modules having different focal lengths in a portable electronic device has been suggested.

However, this method may require a plurality of camera modules having different focal lengths for the optical zoom effect, a structure thereof may be complicated.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various examples provide an optical imaging system which may implement a zoom function by changing a focal length.

In one general aspect, an optical imaging system includes a plurality of fixed lenses disposed along an optical axis; a first reflective member disposed on an object side of the plurality of lenses; and a plurality of reflective members disposed on an image side of the plurality of lenses. At least one of the plurality of lenses is a variable lens having a variable focal length, and each of the plurality of reflective members is configured to move as the focal length of the variable lens changes.

The variable lens may be configured to have a first focal length or a second focal length as the focal length changes, the first focal length may be positive, and the second focal length may be negative.

The variable lens may include a liquid lens and a flat lens attached to an image-side surface of the liquid lens.

A radius of curvature of an object-side surface of the liquid lens may be variable and a thickness on an optical axis of the liquid lens may be variable.

The variable lens may be configured to have a first focal length or a second focal length as the focal length changes, the first focal length may be positive, and the second focal length may be negative. When the variable lens has the first focal length, the radius of curvature of the object-side surface of the liquid lens may be positive, when the variable lens has the second focal length, the radius of curvature of the object-side surface of the liquid lens may be negative, and the thickness on the optical axis of the liquid lens may be smaller when the variable lens has the second focal length than when the variable lens has the first focal length.

The plurality of lenses may include a first lens, a second lens, a third lens, a fourth lens, a fifth lens, and a sixth lens disposed in order from the object side, and the variable lens may be the second lens or the sixth lens.

The variable lens may be the second lens, the first lens may have positive refractive power, the second lens may have positive or negative refractive power, the third lens may have negative refractive power, the fourth lens may have positive refractive power, the fifth lens may have negative refractive power, and the sixth lens may have positive refractive power.

The variable lens may be the sixth lens, the first lens may have positive refractive power, the second lens may have negative refractive power, the third lens may have positive refractive power, the fourth lens may have negative refractive power, the fifth lens may have positive refractive power, and the sixth lens may have positive or negative refractive power.

The plurality of reflective members may include a second reflective member and a third reflective member, the second reflective member may include a reflective surface configured to refract light in a direction perpendicular to an optical axis of the plurality of lenses, and the third reflective member may include a reflective surface configured to refract light reflected by the second reflective member in a direction parallel to the optical axis of the plurality of lenses.

The second reflective member and the third reflective member may be configured to move together.

The optical imaging system may satisfy $10 < fv\_1/D6R\_1$, where $fv\_1$ is a first focal length of the variable lens, and $D6R\_1$ is a distance on an optical axis from a rearmost lens of the plurality of lenses to a reflective member most adjacent to the rearmost lens among the plurality of reflective members when the variable lens has the first focal length.

The optical imaging system may satisfy $-15 < fv\_2/D6R\_2 < -3$, where $fv\_2$ is a second focal length of the variable lens, and $D6R\_2$ is a distance on an optical axis from a rearmost lens of the plurality of lenses to a reflective member most adjacent to the rearmost lens among the plurality of reflective members when the variable lens has the second focal length.

The optical imaging system may satisfy $-7 < (fv\_1 \times D6R\_2)/(fv\_2 \times D6R\_1) < -1$, where $fv\_1$ is a first focal length of the variable lens, $fv\_2$ is a second focal length of the variable lens, $D6R\_1$ is a distance on an optical axis from a rearmost lens of the plurality of lenses to a reflective member most adjacent to the rearmost lens among the plurality of reflective members when the variable lens has the first focal length, and $D6R\_2$ is a distance on an optical axis from the rearmost lens to the reflective member most adjacent to the rearmost lens when the variable lens has the second focal length.

The optical imaging system may satisfy $-3 < fv\_2/fv\_1 < 0$, where $fv\_1$ is a first focal length of the variable lens, $fv\_2$ is a second focal length of the variable lens, the first focal length is positive, and the second focal length is negative.

The optical imaging system may satisfy $3 < D6R\_2/D6R\_1 < 6$, where $D6R\_1$ is a distance on an optical axis from a rearmost lens of the plurality of lenses to a reflective member most adjacent to the rearmost lens among the plurality of reflective members when the variable lens has a first focal length, and $D6R\_2$ is a distance on an optical axis from the rearmost lens to the reflective member most adjacent to the rearmost lens when the variable lens has a second focal length, and wherein the first focal length is positive and the second focal length is negative.

The optical imaging system may satisfy 0<L1/TTL1<1, where L1 is a linear distance in a direction parallel to an optical axis from an object-side surface of the forwardmost lens of the plurality of lenses to an imaging surface when the variable lens has a first focal length, and TTL1 is a distance on the optical axis from the object-side surface of the forwardmost lens to the imaging surface when the variable lens has the first focal length.

The optical imaging system may satisfy 0<L2/TTL2<1, where L1 is a linear distance in a direction parallel to an optical axis from an object-side surface of the forwardmost lens of the plurality of lenses to an imaging surface when the variable lens has a second focal length, and TTL1 is a distance on the optical axis from the object-side surface of the forwardmost lens to the imaging surface when the variable lens has the second focal length.

The optical imaging system may satisfy 1<(L1×TTL2)/(L2×TTL1)<3, where L1 is a linear distance in a direction parallel to an optical axis from an object-side surface of the forwardmost lens of the plurality of lenses to an imaging surface when the variable lens has a first focal length, L2 is a linear distance in the direction parallel to the optical axis from the object-side surface of the forwardmost lens to the imaging surface when the variable lens has a second focal length, TTL1 is a distance on the optical axis from the object-side surface of the forwardmost lens to the imaging surface when the variable lens has the first focal length, and TTL2 is a distance on the optical axis from the object-side surface of the forwardmost lens to the imaging surface when the variable lens has the second focal length.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
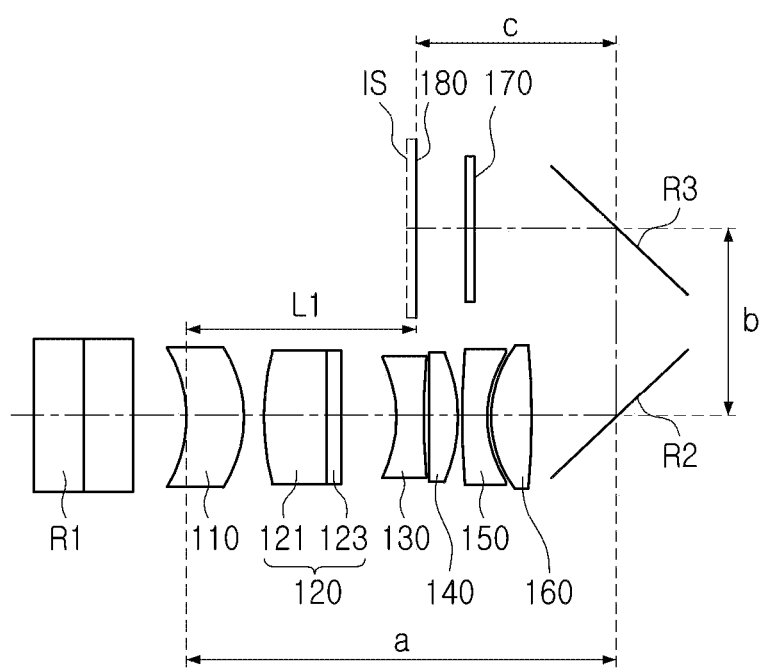
FIG. 1 is a diagram illustrating a first example in which a first lens group and a second lens group are disposed in a first position in an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

In the diagrams illustrating the lenses, a thickness, a size, and a shape of the lens are exaggerated to illustrate an example, and a spherical or an aspherical shape of the lens illustrated in the diagram is an example, and a shape is not limited thereto.

The optical imaging system of the various examples may be mounted on a portable electronic device. For example, the optical imaging system may be a component of a camera module mounted in a portable electronic device. The portable electronic device may be implemented as a portable electronic device such as a mobile communication terminal, a smart phone, or a tablet PC.

The optical imaging system may include a plurality of lenses. The plurality of lenses may be spaced apart from each other by a predetermined distance.

As an example, the optical imaging system may include at least six lenses. However, the number of lenses is not limited thereto, and the number of lenses may be smaller or greater than six is desired.

A first lens (or a forwardmost lens) may refer to the lens most adjacent to an object side (or a first reflective member) along an optical axis, and a last lens (or a rearmost lens) refers to a lens most adjacent to an imaging surface (or a second reflective member) along the optical axis.

Also, in each lens, a first surface may refer to a surface adjacent to an object side (or an object-side surface), and a second surface may refer to a surface adjacent to an image side (or an image-side surface). Also, in the example embodiment, a radius of curvature, a thickness, a distance, and a focal length of the lens may be represented in mm, and a unit of a field of view (FOV) may be degree.

The imaging surface may refer to a virtual surface on which a focus is formed by the optical imaging system. Alternatively, the imaging surface may refer to one surface of an image sensor through which light is received.

The optical imaging system may include at least six lenses.

For example, the optical imaging system may include a first lens, a second lens, a third lens, a fourth lens, a fifth lens, and a sixth lens arranged in order from an object side (or the first reflective member).

The optical imaging system may include seven or more lenses if desired. Also, the optical imaging system may further include an image sensor for converting an incident image of a subject into an electric signal.

The optical imaging system may further include a plurality of reflective members having reflective surfaces which may change an optical path. For example, each of the plurality of reflective members may be a mirror or a prism.

One of the plurality of reflective members may be disposed on a front side of the plurality of lenses. For example, the first reflective member may be disposed on a front side of the first lens (disposed adjacent to the object side than the first lens). The other reflective members may be disposed on a rear side of the plurality of lenses. As an example, the other reflective member may be disposed between the sixth lens and the image sensor (or an imaging surface) along the optical axis.

By refracting an optical path several times by arranging the plurality of reflective members between the plurality of lenses and the image sensor, the light path may be formed long in a relatively narrow space.

Accordingly, the optical imaging system may have a reduced size and a long focal length.

Also, the optical imaging system may further include an infrared cut-off filter (hereinafter, referred to as a filter) for blocking infrared rays. The filter may be disposed between the reflective member disposed most adjacent to the image sensor among the plurality of reflective members and the image sensor.

Overall lenses included in the optical imaging system in an example embodiment may be formed of a plastic material.

One of the plurality of lenses may be configured as a lens of which a focal length changes (hereinafter, referred to as a "variable lens"). The variable lens may include a liquid lens and a flat lens attached to the liquid lens.

The lenses other than the variable lens may have an aspherical surface. For example, each of the lenses other than the variable lens may have at least one aspherical surface.

The aspherical surface of the lens may be represented by Equation 1.

$$Z = \frac{cY^2}{1+\sqrt{1-(1+K)c^2Y^2}} + AY^4 + BY^6 + CY^8 + DY^{10} + EY^{12} \quad \text{[Equation 1]}$$

In Equation 1, c is a radius of curvature of the lens (a reciprocal of a radius of curvature), K is a conic constant, and Y is a distance from an arbitrary point on the aspherical surface of the lens to the optical axis. Also, constants A to E refer to aspheric coefficients. Z represents a distance (SAG) from an arbitrary point on the aspherical surface of the lens to a vertex of the aspherical surface.

The optical imaging system may include a first lens, a second lens, a third lens, a fourth lens, a fifth lens, and a sixth lens arranged in order from the object side toward the image side. The second lens or the sixth lens may be a variable lens.

For example, the second lens or the sixth lens may have positive refractive power or negative refractive power as the focal length changes.

In the optical imaging system, since a focal length of one of the plurality of lenses may change, the focal length of the optical imaging system may also change.

Therefore, even when the lens is not directly moved, the focal length of the optical imaging system may change, such that a zoom effect may be easily implemented.

When the focal length is changed by directly moving the lens, a moving distance of the lens may need to be secured, and accordingly, the overall length of the optical imaging system may increase. However, the optical imaging system in an example embodiment may implement a zoom effect and may have a reduced size.

The variable lens may include a liquid lens and a flat lens.

In the liquid lens, a radius of curvature and a thickness of the object-side surface may change. Accordingly, the focal length of the liquid lens may change. The thickness may refer to the thickness on the optical axis.

When the variable lens has positive refractive power, the radius of curvature of the object-side surface of the liquid lens may be positive. When the variable lens has negative refractive power, the radius of curvature of the object-side surface of the liquid lens may be negative.

The thickness on the optical axis of the liquid lens may be smaller when the variable lens has negative refractive power than when the variable lens has positive refractive power.

The flat lens may be coupled to an image-side surface of the liquid lens to support the liquid lens. For example, the liquid lens and the flat lens may be bonded to each other. In the flat lens, both the object-side surface and the image-side surface may be flat.

A plurality of reflective members may be disposed between the plurality of lenses and the image sensor. For example, the plurality of reflective members may be disposed between a rearmost lens among the plurality of lenses and the image sensor. The optical axis may be folded by the plurality of reflective members disposed between the rearmost lens and the image sensor.

The plurality of reflective members disposed between the rearmost lens and the image sensor may be moved. Accordingly, a distance on the optical axis between the rearmost lens and the image sensor may change, such that, even when focal length of the imaging optical imaging system changes, a focus may be easily formed on the image sensor (or the imaging surface).

Accordingly, the optical imaging system may have an optical zoom function and a focus adjustment function.

The optical imaging system may have characteristics of a telephoto lens having a relatively narrow field of view and a long focal length.

The optical imaging system may satisfy at least one of conditional equations as below:

| | |
|---|---|
| $10 < fv\_1/D6R\_1$ | [Conditional equation 1] |
| $-15 < fv\_2/D6R\_2 < -3$ | [Conditional equation 2] |
| $-7 < (fv\_1 \times D6R\_2)/(fv\_2 \times D6R\_1) < -1$ | [Conditional equation 3] |
| $-3 < fv\_2/fv\_1 < 0$ | [Conditional equation 4] |
| $3 < D6R\_2/D6R\_1 < 6$ | [Conditional equation 5] |
| $0 < L1/TTL1 < 1$ | [Conditional equation 6] |
| $0 < L2/TTL2 < 1$ | [Conditional equation 7] |
| $1 < (L1 \times TTL2)/(L2 \times TTL1) < 3$ | [Conditional equation 8] |

In the conditional equations, fv_1 is a first focal length of the variable lens, and fv_2 is a second focal length of the variable lens.

A focal length of the variable lens may change. Accordingly, the focal length of the optical imaging system may also change. For example, the optical imaging system may have a first focal length when the variable lens has a first focal length, and the optical imaging system may have a second focal length when the variable lens has a second focal length.

The first focal length of the variable lens may be positive, and the second focal length may be negative.

The second focal length of the optical imaging system may be greater than the first focal length.

D6R_1 is a distance on the optical axis from the rearmost lens to the second reflective member when the optical imaging system has the first focal length (or the variable lens has the first focal length).

D6R_2 is a distance on the optical axis from the rearmost lens to the second reflective member when the optical imaging system has a second focal length (or when the variable lens has a second focal length).

When the optical imaging system may include six lenses, the rearmost lens may be a sixth lens.

L1 is a linear distance in a direction parallel to the optical axis from the object-side surface of the first lens to the imaging surface when the imaging optical imaging system has the first focal length (or when the variable lens has the first focal length) to be.

L2 is a linear distance in a direction parallel to the optical axis from the object-side surface of the first lens to the imaging surface when the imaging optical imaging system has a second focal length (or when the variable lens has a second focal length). L1 and L2 may be the same.

TTL1 is a distance on the optical axis from the object-side surface of the first lens to the imaging surface when the optical imaging system has the first focal length (or the variable lens has the first focal length).

TTL2 is a distance on the optical axis from the object-side surface of the first lens to the imaging surface when the optical imaging system has the second focal length (or the variable lens has the second focal length).

A first example of the optical imaging system will be described with reference to FIGS. 1 to 4.

Figure 3:
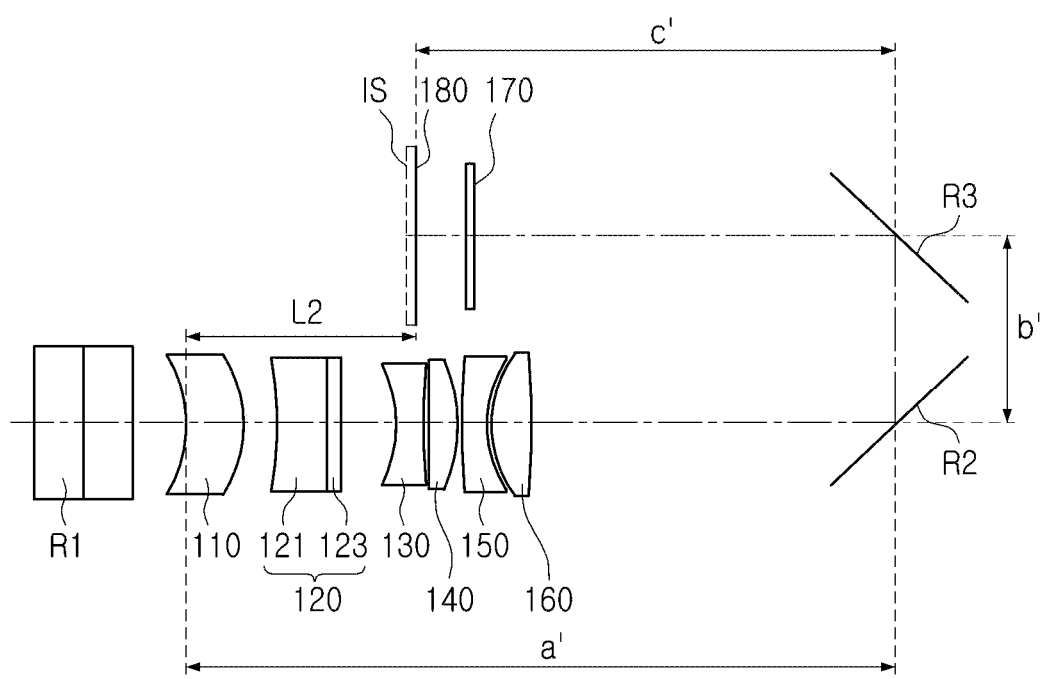
FIG. 3 is a diagram illustrating a first example in which a first lens group and a second lens group are disposed in a second position in an optical imaging system.

FIG. 1 is a diagram illustrating a state in which the optical imaging system has a first focal length, and FIG. 3 is a diagram illustrating a state in which the optical imaging system has a second focal length.

The optical imaging system in a first example may include a first lens 110, a second lens 120, a third lens 130, a fourth lens 140, a fifth lens 150, and a sixth lens 160.

The optical imaging system may form a focus on an imaging surface 180.

Also, the optical imaging system may further include a filter 170 and an image sensor IS. Also, a stop may be disposed between the third lens 130 and the fourth lens 140.

Also, the optical imaging system may further include a first reflective member R1 disposed on a front side (object side) of the first lens 110 and having a reflective surface for changing an optical path. The first reflective member R1 may be implemented by a prism, or may be provided as a mirror.

In FIGS. 1 and 3, the prism, the first reflective member R1, may have a flat plate shape, but the actual prism may have a triangular columnar shape.

Light incident to the first reflective member R1 may be refracted by the first reflective member R1 and may pass through the first to sixth lenses 110 to 160. For example, light incident on the first reflective member R1 along the first optical axis may be refracted toward a second optical axis perpendicular to the first optical axis.

Also, the optical imaging system may further include a second reflective member R2 and a third reflective member R3 disposed on a rear side (image side) of the sixth lens 160 and each having a reflective surface for changing an optical path. The second reflective member R2 and the third reflective member R3 may be disposed between the sixth lens 160 and the image sensor IS.

Figure 21:
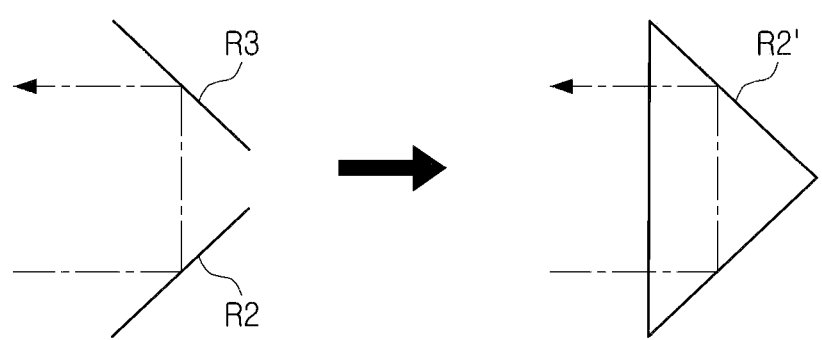
FIG. 21 is a modified example of a plurality of reflective members according to an example.

In the first example, the second reflective member R2 and the third reflective member R3 may be implemented as mirrors, or may be provided as prisms. Also, as illustrated in FIG. 21, the second reflective member R2 and the third reflective member R3 may be provided in the form of a single prism R2' having two reflective surfaces.

Light passing through the first to sixth lenses 110 to 160 may be refracted by the second reflective member R2. For example, light passing through the first to sixth lenses 110 to 160 may be refracted toward a third optical axis perpendicular to the second optical axis by the second reflective member R2. The second reflective member R2 may have a reflective surface for refracting light to a third optical axis perpendicular to the second optical axis.

Light refracted by the second reflective member R2 may be refracted again by the third reflective member R3. For example, light refracted toward the third optical axis by the second reflective member R2 may be refracted toward the fourth optical axis perpendicular to the third optical axis by the third reflective member R3, and may be received in the image sensor IS. The third reflective member R3 may have a reflective surface for refracting light to a fourth optical axis perpendicular to the third optical axis.

The second optical axis and the fourth optical axis may be parallel to each other.

The filter 170 may be disposed between the third reflective member R3 and the image sensor IS.

At least one of the first to sixth lenses 110 to 160 may be a variable lens having a focal length which may change. For example, the second lens 120 may be a variable lens. The second lens 120 may include a liquid lens 121 and a flat lens 123 attached to an image-side surface of the liquid lens 121.

A radius of curvature and a thickness of the object-side surface of the liquid lens 121 may change. Accordingly, the focal length of the liquid lens 121 may change. The thickness may refer to the thickness on the optical axis.

As the focal length of the second lens 120 changes, the focal length of the optical imaging system may also change.

Even when the first to sixth lenses 110 to 160 are not moved, the focal length of the imaging optical imaging system may change by changing the focal length of the second lens 120, such that the zoom effect may be easily implemented.

Since the focal length of the optical imaging system changes, the second reflective member R2 and the third reflective member R3 may move to form a focus on the imaging surface 180. For example, as the second reflective member R2 and the third reflective member R3 move, a distance between the sixth lens 160 and the second reflective member R2 may change, and a distance between the third reflective member R3 and the image sensor IS (or the imaging surface 180) may also change.

Here, the "distance" may refer to the distance on the optical axis between the two members.

The second reflective member R2 and the third reflective member R3 may be moved together. Accordingly, a distance on the optical axis between the second reflective member R2 and the third reflective member R3 may not change.

The length of the optical path may change by the movement of the second reflective member R2 and the third reflective member R3.

The first reflective member R1 and the first to sixth lenses 110 to 160 may be fixed members of which positions may be fixed, and the second reflective member R2 and the third reflective member R3 may be movable members of which positions may change.

Characteristics of each lens (a radius of curvature, a thickness of the lens or a distance between lenses, a refractive index, and an Abbe number) may be listed in Table 1.

In Table 1, the refractive indexes of the second reflective member R2 and the third reflective member R3 may be indicated by negative numbers, which may indicate that the second reflective member R2 and the third reflective member R3 may have a reflective surface for reflecting light.

TABLE 1

| Surface No. | Note | Radius of curvature | Thickness or distance | Refractive index | Abbe number |
|---|---|---|---|---|---|
| S1 | First reflective member | Infinity | 2.4500 | 1.722 | 29.5 |
| S2 | | Infinity | 2.4500 | 1.722 | 29.5 |
| S3 | | Infinity | 1.9421 | | |
| S4 | First | −4.9337 | 2.0000 | 1.671 | 20 |
| S5 | lens | −5.4289 | D12 | | |
| S6 | Second | R3 | T2 | 1.298 | 100 |
| S7 | lens | Infinity | 0.5000 | 1.526 | 55 |
| S8 | | Infinity | 2.0000 | | |
| S9 | Third | −5.1925 | 0.9800 | 1.544 | 56 |
| S10 | lens | 26.6662 | 0.0940 | | |
| S11 | Stop | Infinity | 0.1000 | | |
| S12 | Fourth | −2804.6225 | 1.0000 | 1.544 | 56 |
| S13 | lens | −6.5474 | 0.1000 | | |
| S14 | Fifth | 21.9524 | 1.0000 | 1.595 | 31.1 |
| S15 | lens | 5.3446 | 0.1000 | | |
| S16 | Sixth | 4.7880 | 1.4165 | 1.544 | 56 |
| S17 | lens | −25.9774 | D6R | | |
| S18 | Second | Infinity | 0.0000 | −1 | |

TABLE 1-continued

| Surface No. | Note | Radius of curvature | Thickness or distance | Refractive index | Abbe number |
|---|---|---|---|---|---|
| | reflective member | | | | |
| S19 | | Infinity | −7.0000 | | |
| S20 | Third reflective member | Infinity | 0.0000 | −1 | |
| S21 | | Infinity | DR3F | | |
| S22 | Filter | Infinity | 0.2100 | 1.519 | 64.2 |
| S23 | | Infinity | 2.0350 | | |
| S24 | Imaging surface | Infinity | | | |

TABLE 2

| | In case of first focal length | In case of second focal length |
|---|---|---|
| R3 | 10.8963 | −22.0525 |
| D12 | 0.7278 | 1.1606 |
| T2 | 2.2907 | 1.8578 |
| D6R | 3 | 17.0064 |
| DR3F | 5.0347 | 19.0410 |

R3 is a radius of curvature of the object-side surface of the second lens 120, D12 is a distance on the optical axis from the image-side surface of the first lens 110 to the object-side surface of the second lens 120, T2 is the thickness on the optical axis of the second lens 120, D6R is the distance on the optical axis from the image-side surface of the sixth lens 160 to the second reflective member R2, and DR3F is the distance on the optical axis between the third reflective member R3 and the filter 170.

TABLE 3

| | In case of first focal length | In case of second focal length |
|---|---|---|
| f | 16.2019 | 31.7632 |
| f1 | 129.4498 | 129.4498 |
| f2 | 36.5646 | −74.0016 |
| f3 | −7.9005 | −7.9005 |
| f4 | 12.0602 | 12.0602 |

TABLE 3-continued

| | In case of first focal length | In case of second focal length |
|---|---|---|
| f5 | −12.1492 | −12.1492 |
| f6 | 7.5529 | 7.5529 | f is the focal length of the optical imaging system, f1 is the focal length of the first lens, f2 is the focal length of the second lens, f3 is the focal length of the third lens, f4 is the focal length of the fourth lens, f5 is the focal length of the fifth lens, and f6 is the focal length of the sixth lens.

In the first example, the first lens 110 may have positive refractive power, the first surface of the first lens 110 may be concave, and the second surface of the first lens 110 may be convex.

The second lens 120 may be a variable lens of which the focal length may change. For example, the second lens 120 may have a first focal length and a second focal length. The second lens 120 may include a liquid lens 121 and a flat lens 123 attached to an image-side surface of the liquid lens 121.

When the second lens 120 has a first focal length, the second lens 120 may have positive refractive power. Also, the first surface of the second lens 120 (e.g., the object-side surface of the liquid lens 121) may have a convex, and the second surface of the second lens 120 (e.g., the image side of the flat lens 123) may be flat.

When the second lens 120 has a second focal length, the second lens 120 may have negative refractive power. Also, the first surface of the second lens 120 may be concave, and the second surface of the second lens 120 may be flat.

The third lens 130 may have negative refractive power, and the first and second surfaces of the third lens 130 may be concave.

The fourth lens 140 may have positive refractive power, the first surface of the fourth lens 140 may be concave, and the second surface of the fourth lens 140 may be convex.

The fifth lens 150 may have negative refractive power, the first surface of the fifth lens 150 may be convex, and the second surface of the fifth lens 150 may be concave.

The sixth lens 160 may have positive refractive power, and the first and second surfaces of the sixth lens 160 may be convex.

Each surface of the first lens 110 and the third lens 130 to the sixth lens 160 may have an aspherical coefficient as illustrated in Table 8. For example, the object-side surfaces and the image-side surfaces of the first lens 110 and the third lens 130 to sixth lens 160 may be aspherical.

TABLE 4

| | Conic constant (K) | Fourth coefficient (A) | Sixth coefficient (B) | Eighth coefficient (C) | Tenth coefficient (D) | Twelfth coefficient (E) |
|---|---|---|---|---|---|---|
| S4 | 0 | 0.000485033 | 5.92E−05 | −1.34E−06 | −8.69E−09 | 1.53E−08 |
| S5 | 0 | 0.000531678 | 3.41E−05 | −6.41E−07 | −1.56E−08 | 6.36E−09 |
| S9 | 0 | 0.002786538 | −1.61E−05 | 2.50E−06 | −1.30E−09 | 1.41E−07 |
| S10 | 0 | −0.000184995 | −1.88E−06 | 3.42E−06 | 1.64E−07 | 1.25E−07 |
| S12 | 0 | −0.000463124 | −2.94E−05 | −5.03E−06 | −6.15E−07 | −4.74E−08 |
| S13 | 0 | 0.000766595 | −3.87E−06 | −5.50E−07 | −5.64E−07 | −9.26E−08 |
| S14 | 0 | −2.58E−04 | 2.75E−05 | 2.71E−06 | −8.01E−08 | 6.64E−09 |
| S15 | 0 | 2.89641E−05 | −4.24E−05 | −8.80E−06 | −4.67E−07 | −6.17E−08 |
| S16 | 0 | −0.000543734 | −4.28E−05 | −3.16E−06 | 1.06E−07 | 2.91E−08 |
| S17 | 0 | −0.00027459 | 3.69E−05 | 3.07E−06 | 8.39E−07 | 7.03E−08 |

Figure 2:
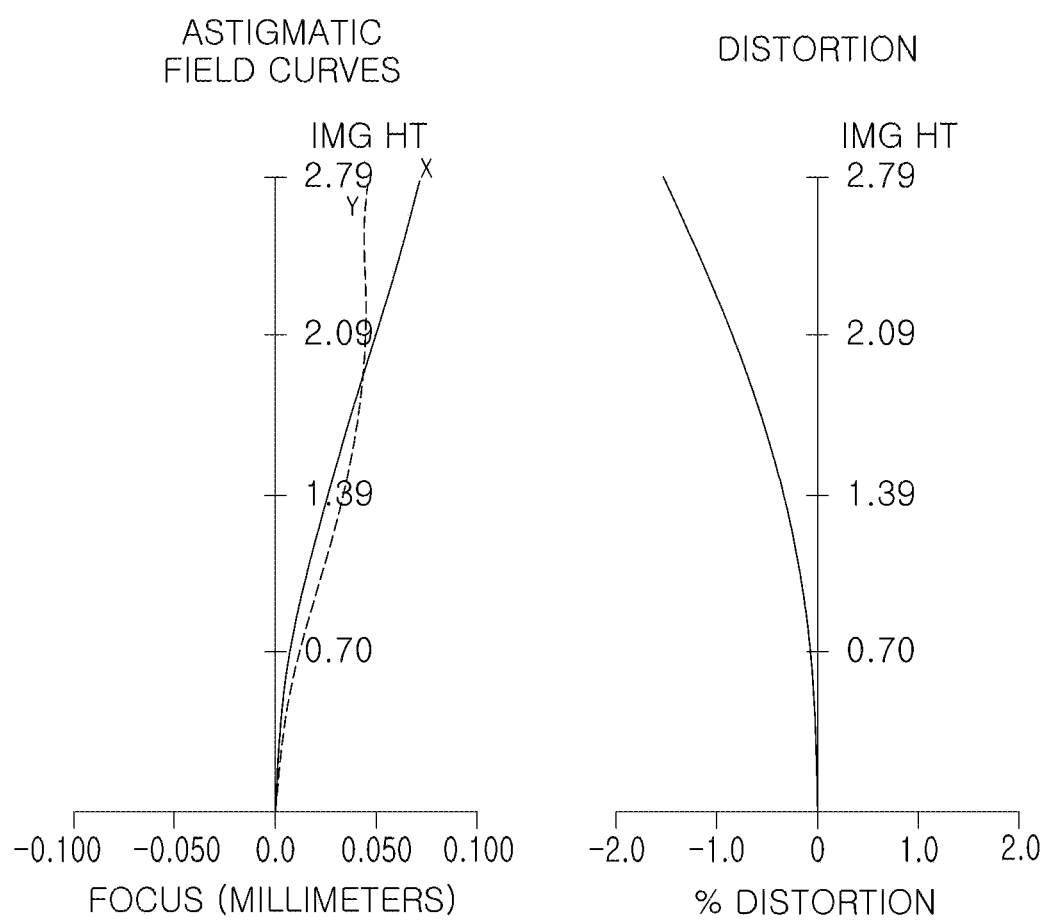
FIG. 2 is a curve indicating aberration properties of the optical imaging system illustrated in FIG. 1.
Figure 4:
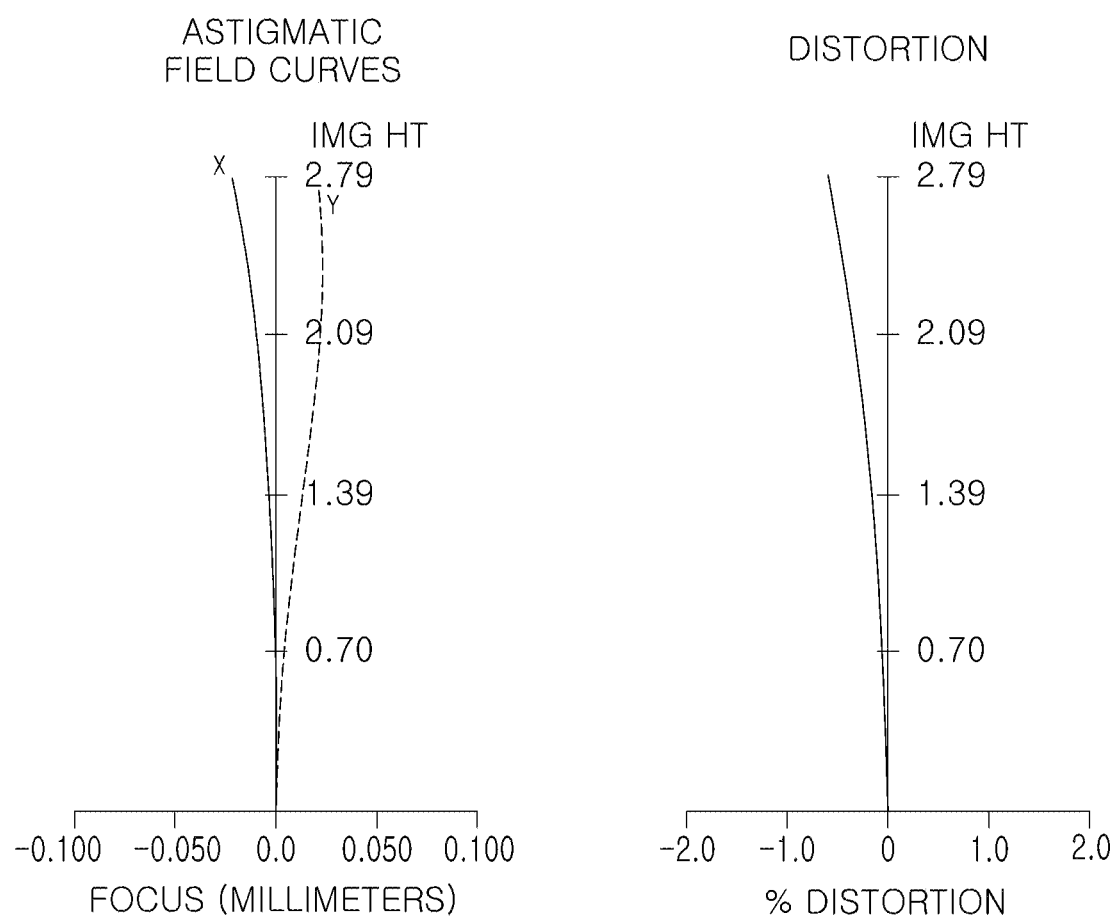
FIG. 4 is a curve indicating aberration properties of the optical imaging system illustrated in FIG. 3.

Also, the optical imaging system configured as described above may have aberration properties illustrated in FIGS. 2 and 4.

A second example of the optical imaging system will be described with reference to FIGS. 5 to 8.

Figure 5:
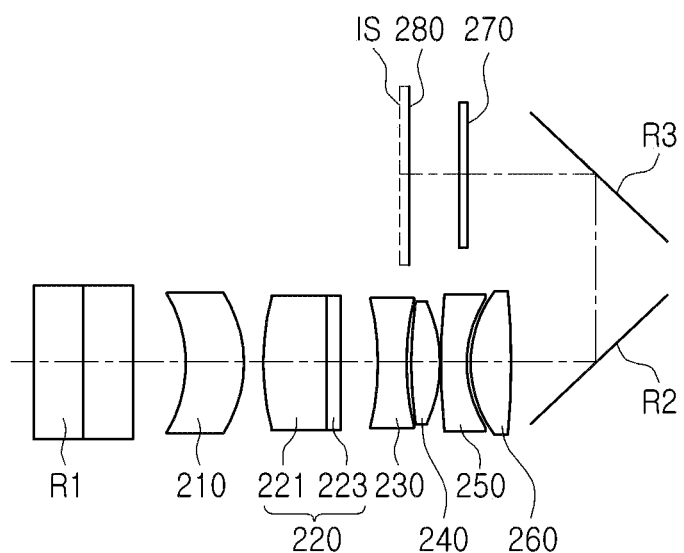
FIG. 5 is a diagram illustrating a second example in which a first lens group and a second lens group are disposed in a first position in an optical imaging system.
Figure 7:
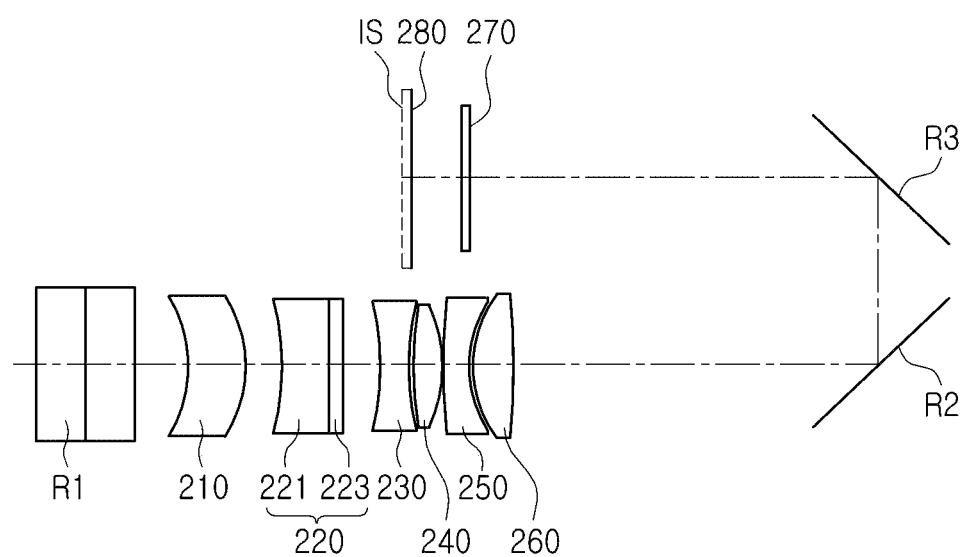
FIG. 7 is a diagram illustrating a second example in which a first lens group and a second lens group are disposed in a second position in an optical imaging system.

FIG. 5 is a diagram illustrating a state in which the optical imaging system has a first focal length, and FIG. 7 is a diagram illustrating a state in which the optical imaging system has a second focal length.

The optical imaging system in a second example may include a first lens 210, a second lens 220, a third lens 230, a fourth lens 240, a fifth lens 250, and a sixth lens 260.

The optical imaging system may form a focus on an imaging surface 280.

Also, the optical imaging system may further include a filter 270 and an image sensor IS. Also, a stop may be disposed between the third lens 230 and the fourth lens 240.

Also, the optical imaging system may further include a first reflective member R1 disposed on a front side of the first lens 210 and having a reflective surface for changing an optical path. The first reflective member R1 may be implemented by a prism, or may be provided as a mirror.

In FIGS. 5 and 7, the prism, the first reflective member R1, may have a flat plate shape, but the actual prism may have a triangular columnar shape.

Light incident to the first reflective member R1 may be refracted by the first reflective member R1 and may pass through the first to sixth lenses 210 to 260. For example, light incident to the first reflective member R1 along the first optical axis may be refracted toward a second optical axis perpendicular to the first optical axis.

Also, the optical imaging system may further include a second reflective member R2 and a third reflective member R3 disposed on a rear side of the sixth lens 260 and each having a reflective surface for changing an optical path. The second reflective member R2 and the third reflective member R3 may be disposed between the sixth lens 260 and the image sensor IS.

The second reflective member R2 and the third reflective member R3 may be implemented as mirrors, or may be provided as prisms. Also, as illustrated in FIG. 21, the second reflective member R2 and the third reflective member R3 may be provided in the form of a single prism R2' having two reflective surfaces.

Light passing through the first to sixth lenses 210 to 260 may be refracted by the second reflective member R2. For example, light passing through the first to sixth lenses 210 to 260 may be refracted toward a third optical axis perpendicular to the second optical axis by the second reflective member R2. The second reflective member R2 may have a reflective surface for refracting light to a third optical axis perpendicular to the second optical axis.

Light refracted by the second reflective member R2 may be refracted again by the third reflective member R3. For example, light refracted toward the third optical axis by the second reflective member R2 may be refracted toward the fourth optical axis perpendicular to the third optical axis by the third reflective member R3, and may be received in the image sensor IS. The third reflective member R3 may have a reflective surface for refracting light to a fourth optical axis perpendicular to the third optical axis.

The second optical axis and the fourth optical axis may be parallel to each other.

The filter 270 may be disposed between the third reflective member R3 and the image sensor IS.

At least one of the first to sixth lenses 210 to 260 may be a variable lens having a focal length which may change. For example, the second lens 220 may be a variable lens. The second lens 220 may include a liquid lens 221 and a flat lens 223 attached to an image-side surface of the liquid lens 221.

A radius of curvature and a thickness of the object-side surface of the liquid lens 221 may change. Accordingly, the focal length of the liquid lens 221 may change. The thickness may refer to the thickness on the optical axis.

As the focal length of the second lens 220 changes, the focal length of the optical imaging system may also change.

Even when the first to sixth lenses 210 to 260 are not moved, the focal length of the imaging optical imaging system may change by changing the focal length of the second lens 220, such that the zoom effect may be easily implemented.

Since the focal length of the optical imaging system changes, the second reflective member R2 and the third reflective member R3 may move to form a focus on the imaging surface. For example, as the second reflective member R2 and the third reflective member R3 move, a distance between the sixth lens 260 and the second reflective member R2 may change, and a distance between the third reflective member R3 and the image sensor IS (or the imaging surface 280) may also change.

Here, the "distance" may refer to the distance on the optical axis between the two members.

The second reflective member R2 and the third reflective member R3 may be moved together. Accordingly, a distance on the optical axis between the second reflective member R2 and the third reflective member R3 may not change.

The length of the optical path may change by the movement of the second reflective member R2 and the third reflective member R3.

The first reflective member R1 and the first to sixth lenses 210 to 260 may be fixed members of which positions may be fixed, and the second reflective member R2 and the third reflective member R3 may be movable members of which positions may change.

Characteristics of each lens (a radius of curvature, a thickness of the lens or a distance between lenses, a refractive index, and an Abbe number) may be listed in Table 5.

In Table 5, the refractive indexes of the second reflective member R2 and the third reflective member R3 may be indicated by negative numbers, which may indicate that the second reflective member R2 and the third reflective member R3 may have a reflective surface for reflecting light.

TABLE 5

| Surface No. | Note | Radius of curvature | Thickness or distance | Refractive index | Abbe number |
|---|---|---|---|---|---|
| S1 | First reflective member | Infinity | 2.4400 | 1.722 | 29.5 |
| S2 | | Infinity | 2.4400 | 1.722 | 29.5 |
| S3 | | Infinity | 1.9421 | | |
| S4 | First lens | −10.1200 | 2.0000 | 1.671 | 20 |
| S5 | | −10.3100 | D12 | | |
| S6 | Second | R3 | T2 | 1.298 | 100 |

TABLE 5-continued

| Surface No. | Note | Radius of curvature | Thickness or distance | Refractive index | Abbe number |
|---|---|---|---|---|---|
| S7 | lens | Infinity | 0.5000 | 1.526 | 55 |
| S8 | | Infinity | 2.0000 | | |
| S9 | Third | −6.7700 | 1.0000 | 1.544 | 56 |
| S10 | lens | 10.5300 | 0.0950 | | |
| S11 | Stop | Infinity | 0.1000 | | |
| S12 | Fourth | 14.5000 | 1.0000 | 1.544 | 56 |
| S13 | lens | −7.2000 | 0.1000 | | |
| S14 | Fifth | 366.6400 | 1.0000 | 1.595 | 31.1 |
| S15 | lens | 7.3600 | 0.1000 | | |
| S16 | Sixth | 6.0400 | 1.4369 | 1.544 | 56 |
| S17 | lens | −17.1965 | D6R | | |
| S18 | Second reflective member | Infinity | 0.0000 | −1 | |
| S19 | | Infinity | −7.3358 | | |
| S20 | Third reflective member | Infinity | 0.0000 | −1 | |
| S21 | | Infinity | DR3F | | |
| S22 | Filter | Infinity | 0.2100 | 1.519 | 64.2 |
| S23 | | Infinity | 1.6100 | | |
| S24 | Imaging surface | Infinity | | | |

TABLE 6

| | In case of first focal length | In case of second focal length |
|---|---|---|
| R3 | 14.19 | −16.246 |
| D12 | 1.3194 | 1.7348 |
| T2 | 2.222 | 1.8065 |
| D6R | 3 | 13.6968 |
| DR3F | 5 | 15.6968 |

The definitions of R3, D12, T2, D6R and DR3F may be the same as in the first example.

TABLE 7

| | In case of first focal length | In case of second focal length |
|---|---|---|
| f | 16.58 | 28.55 |
| f1 | 250 | 250 |
| f2 | 47.6 | −54.5168 |
| f3 | −7.42 | −7.42 |
| f4 | 9 | 9 |
| f5 | −12.651 | −12.651 |
| f6 | 8.4 | 8.4 |

The definitions of f, f1, f2, f3, f4, f5, and f6 may be the same as those of the first example.

In the second example, the first lens 210 may have positive refractive power, the first surface of the first lens 210 may be concave, and the second surface of the first lens 210 may be convex.

The second lens 220 may be a variable lens of which the focal length may change. For example, the second lens 220 may have a first focal length and a second focal length. The second lens 220 may include a liquid lens 221 and a flat lens 223 attached to an image-side surface of the liquid lens 221.

When the second lens 220 has a first focal length, the second lens 220 may have positive refractive power. Also, the first surface of the second lens 220 (e.g., the object-side surface of the liquid lens 221) may be convex, and the second surface of the second lens 220 (e.g., the image side of the flat lens 223) may be flat.

When the second lens 220 has a second focal length, the second lens 220 may have negative refractive power. Also, the first surface of the second lens 220 may be concave, and the second surface of the second lens 220 may be flat.

The third lens 230 may have negative refractive power, and the first and second surfaces of the third lens 230 may be concave.

The fourth lens 240 may have positive refractive power, the first surface of the fourth lens 240 may be concave, and the second surface of the fourth lens 240 may be convex.

The fifth lens 250 may have negative refractive power, the first surface of the fifth lens 250 may be convex, and the second surface of the fifth lens 250 may be concave.

The sixth lens 260 may have positive refractive power, and the first and second surfaces of the sixth lens 260 may be convex.

Each surface of the first lens 210 and the third lens 230 to the sixth lens 260 may have an aspherical coefficient as illustrated in Table 8. For example, the object-side surfaces and the image-side surfaces of the first lens 210 and the third lens 230 to sixth lens 260 may be aspherical.

TABLE 8

| | Conic constant (K) | Fourth coefficient (A) | Sixth coefficient (B) | Eighth coefficient (C) | Tenth coefficient (D) | Twelfth coefficient (E) |
|---|---|---|---|---|---|---|
| S4 | 0 | 0.001045263 | 6.30E−05 | −2.11E−05 | 1.92E−06 | −7.83E−08 |
| S5 | 0 | 0.001497638 | −1.86E−05 | −1.21E−06 | −5.65E−07 | 3.85E−08 |
| S9 | 0 | 0.005401982 | −4.42E−04 | 1.54E−08 | 6.99E−06 | −1.24E−06 |
| S10 | 0 | −0.000320078 | 1.01E−05 | −9.72E−06 | −4.50E−06 | −6.99E−07 |
| S12 | 0 | −0.000949189 | −5.73E−05 | −1.06E−05 | −1.84E−06 | −7.99E−08 |
| S13 | 0 | 0.002971337 | 5.63E−07 | 2.15E−06 | 1.99E−06 | −2.66E−07 |
| S14 | 0 | 8.08E−04 | 2.22E−04 | 9.59E−06 | −2.39E−06 | −5.87E−07 |
| S15 | 0 | −0.000245536 | −1.15E−04 | −1.22E−05 | −8.45E−07 | 1.66E−08 |
| S16 | 0 | −0.002447921 | −1.19E−04 | −6.54E−06 | 1.03E−06 | 6.85E−08 |
| S17 | 0 | −0.001864786 | 4.16E−05 | 1.19E−05 | −1.68E−06 | 1.50E−07 |

Figure 6:
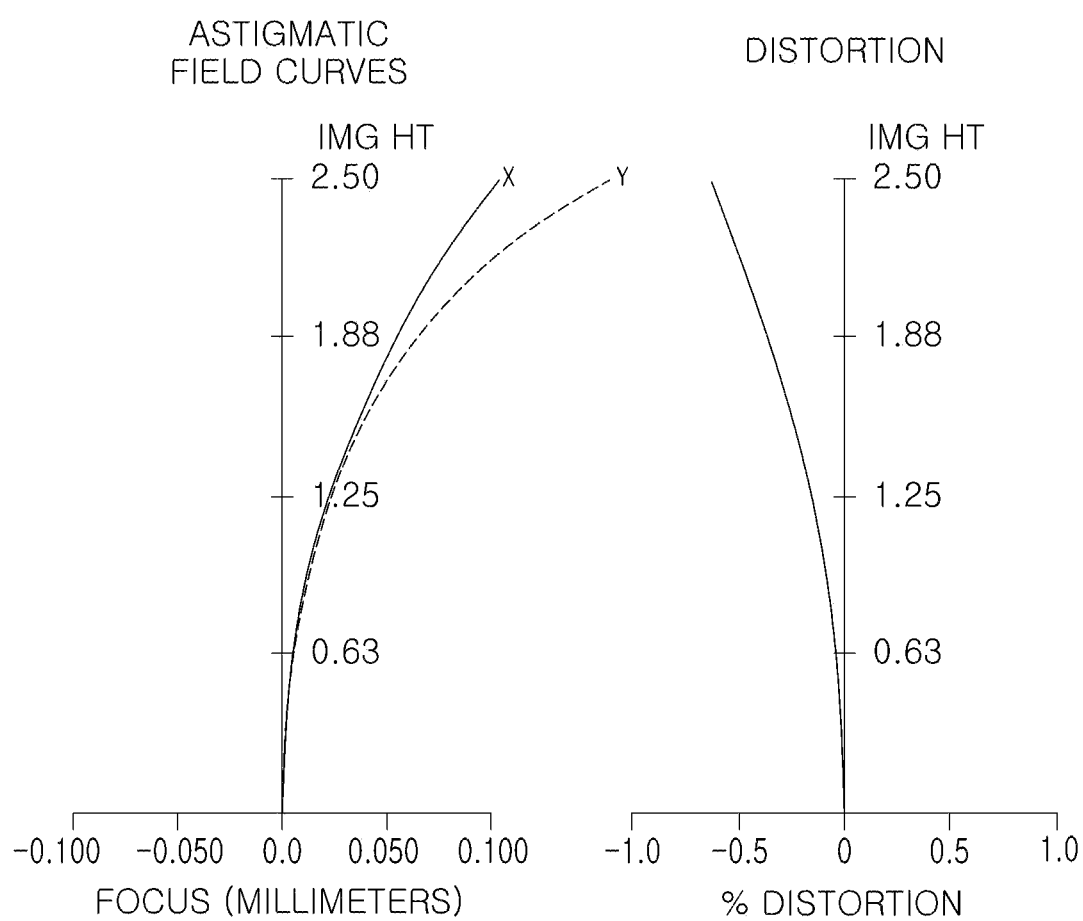
FIG. 6 is a curve indicating aberration properties of the optical imaging system illustrated in FIG. 5.
Figure 8:
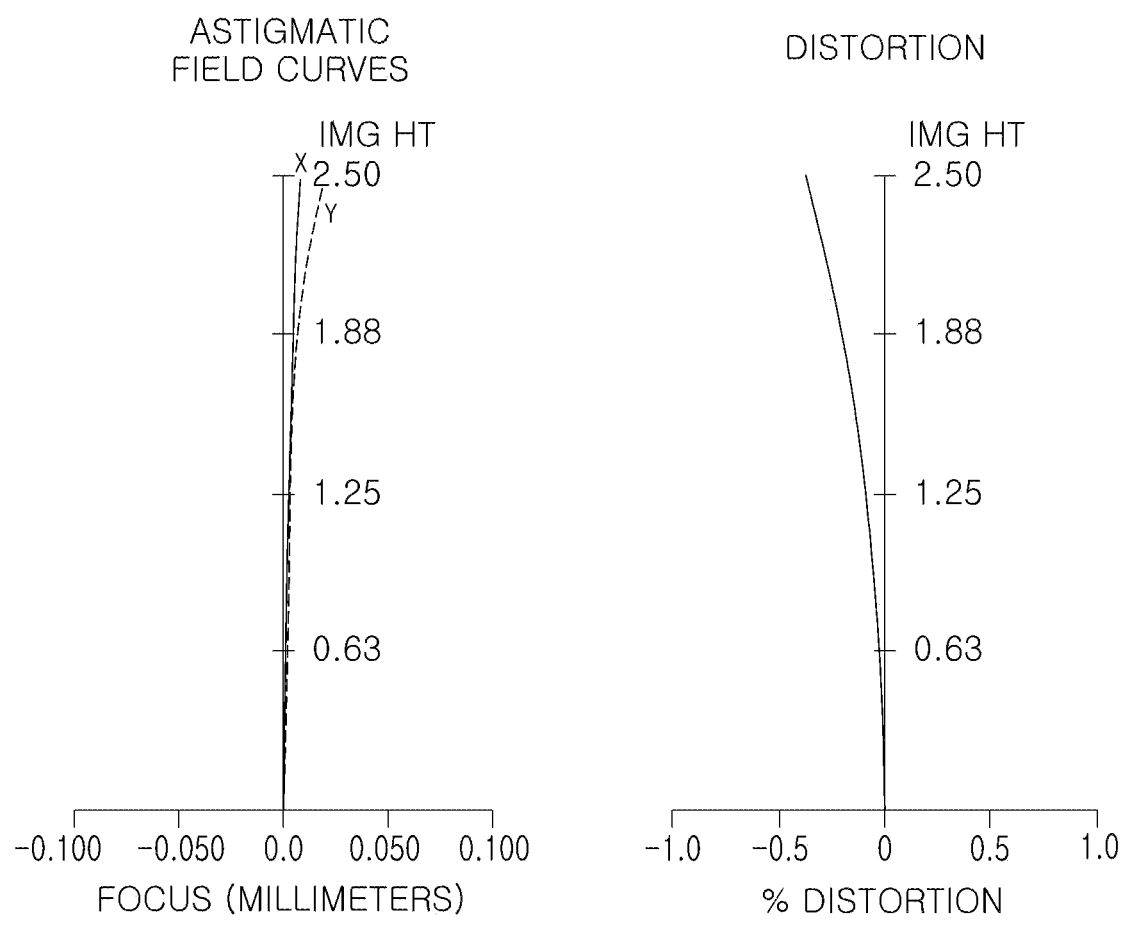
FIG. 8 is a curve indicating aberration properties of the optical imaging system illustrated in FIG. 7.

Also, the optical imaging system configured as described above may have aberration properties illustrated in FIGS. 6 and 8.

A third example of the optical imaging system will be described with reference to FIGS. 9 to 12.

Figure 9:
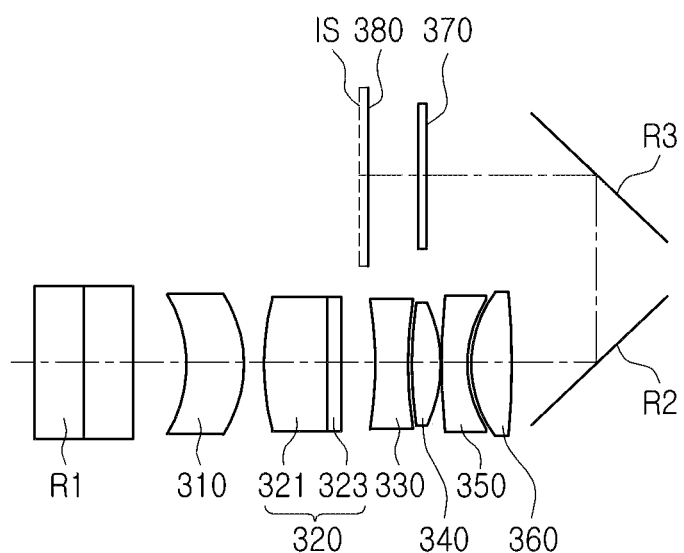
FIG. 9 is a diagram illustrating a third example in which a first lens group and a second lens group are disposed in a first position in an optical imaging system.
Figure 11:
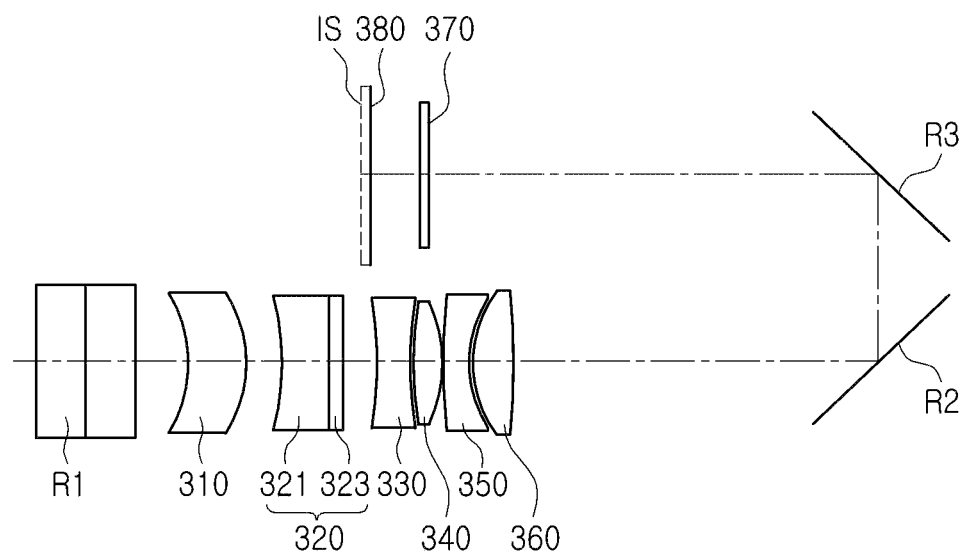
FIG. 11 is a diagram illustrating a third example in which a first lens group and a second lens group are disposed in a second position in an optical imaging system.

FIG. 9 is a diagram illustrating a state in which the optical imaging system has a first focal length, and FIG. 11 is a diagram illustrating a state in which the optical imaging system has a second focal length.

The optical imaging system in a third example may include a first lens 310, a second lens 320, a third lens 330, a fourth lens 340, a fifth lens 350, and a sixth lens 360.

The optical imaging system in the third example may form a focus on an imaging surface 380.

Also, the optical imaging system may further include a filter 370 and an image sensor IS. Also, a stop may be disposed between the third lens 330 and the fourth lens 340.

Also, the optical imaging system may further include a first reflective member R1 disposed on a front side of the first lens 310 and having a reflective surface for changing an optical path. The first reflective member R1 may be implemented by a prism, or may be provided as a mirror.

In FIGS. 9 and 11, the prism, the first reflective member R1, may have a flat plate shape, but the actual prism may have a triangular columnar shape.

Light incident to the first reflective member R1 may be refracted by the first reflective member R1 and may pass through the first to sixth lenses 310 to 360. For example, light incident to the first reflective member R1 along the first optical axis may be refracted toward a second optical axis perpendicular to the first optical axis.

Also, the optical imaging system may further include a second reflective member R2 and a third reflective member R3 disposed on a rear side of the sixth lens 360 and each having a reflective surface for changing an optical path. The second reflective member R2 and the third reflective member R3 may be disposed between the sixth lens 360 and the image sensor IS.

The second reflective member R2 and the third reflective member R3 may be implemented as mirrors, or may be provided as prisms. Also, as illustrated in FIG. 21, the second reflective member R2 and the third reflective member R3 may be provided in the form of a single prism R2' having two reflective surfaces.

Light passing through the first to sixth lenses 310 to 360 may be refracted by the second reflective member R2. For example, light passing through the first to sixth lenses 310 to 360 may be refracted toward a third optical axis perpendicular to the second optical axis by the second reflective member R2. The second reflective member R2 may have a reflective surface for refracting light to a third optical axis perpendicular to the second optical axis.

Light refracted by the second reflective member R2 may be refracted again by the third reflective member R3. For example, light refracted toward the third optical axis by the second reflective member R2 may be refracted toward the fourth optical axis perpendicular to the third optical axis by the third reflective member R3, and may be received in the image sensor IS. The third reflective member R3 may have a reflective surface for refracting light to a fourth optical axis perpendicular to the third optical axis.

The second optical axis and the fourth optical axis may be parallel to each other.

The filter 370 may be disposed between the third reflective member R3 and the image sensor IS.

At least one of the first to sixth lenses 310 to 360 may be a variable lens having a focal length which may change. For example, the second lens 320 may be a variable lens. The second lens 320 may include a liquid lens 321 and a flat lens 323 attached to an image-side surface of the liquid lens 321.

A radius of curvature and a thickness of the object-side surface of the liquid lens 321 may change. Accordingly, the focal length of the liquid lens 321 may change. The thickness may refer to the thickness on the optical axis.

As the focal length of the second lens 320 changes, the focal length of the optical imaging system may also change.

Even when the first to sixth lenses 310 to 360 are not moved, the focal length of the imaging optical imaging system may change by changing the focal length of the second lens 320, such that the zoom effect may be easily implemented.

Since the focal length of the optical imaging system changes, the second reflective member R2 and the third reflective member R3 may move to form a focus on the imaging surface. For example, as the second reflective member R2 and the third reflective member R3 move, a distance between the sixth lens 360 and the second reflective member R2 may change, and a distance between the third reflective member R3 and the image sensor IS (or the imaging surface 380) may also change.

Here, the "distance" may refer to the distance on the optical axis between the two members.

The second reflective member R2 and the third reflective member R3 may be moved together. Accordingly, a distance on the optical axis between the second reflective member R2 and the third reflective member R3 may not change.

The length of the optical path may change by the movement of the second reflective member R2 and the third reflective member R3.

The first reflective member R1 and the first to sixth lenses 310 to 360 may be fixed members of which positions may be fixed, and the second reflective member R2 and the third reflective member R3 may be movable members of which positions may change.

Characteristics of each lens (a radius of curvature, a thickness of the lens or a distance between lenses, a refractive index, and an Abbe number) may be listed in Table 9.

In Table 9, the refractive indexes of the second reflective member R2 and the third reflective member R3 may be indicated by negative numbers, which may indicate that the second reflective member R2 and the third reflective member R3 may have a reflective surface for reflecting light.

TABLE 9

| Surface No. | Note | Radius of curvature | Thickness or distance | Refractive index | Abbe number |
|---|---|---|---|---|---|
| S1 | First reflective member | Infinity | 2.4300 | 1.722 | 29.5 |
| S2 |  | Infinity | 2.4300 | 1.722 | 29.5 |
| S3 |  | Infinity | 1.9421 |  |  |
| S4 | First lens | −5.4127 | 2.0000 | 1.671 | 20 |
| S5 |  | −5.8461 | D12 |  |  |
| S6 | Second lens | R3 | T2 | 1.298 | 100 |
| S7 |  | Infinity | 0.5000 | 1.526 | 55 |
| S8 |  | Infinity | 2.0000 |  |  |

TABLE 9-continued

| Surface No. | Note | Radius of curvature | Thickness or distance | Refractive index | Abbe number |
|---|---|---|---|---|---|
| S9 | Third | −6.7841 | 1.0000 | 1.544 | 56 |
| S10 | lens | 10.4390 | 0.0941 | | |
| S11 | Stop | Infinity | 0.1000 | | |
| S12 | Fourth | 14.2659 | 1.0000 | 1.544 | 56 |
| S13 | lens | −7.0225 | 0.1000 | | |
| S14 | Fifth | 1176.7971 | 1.0000 | 1.595 | 31.1 |
| S15 | lens | 7.1031 | 0.1000 | | |
| S16 | Sixth | 5.8531 | 1.4165 | 1.544 | 56 |
| S17 | lens | −20.1261 | D6R | | |
| S18 | Second reflective member | Infinity | 0.0000 | −1 | |
| S19 | | Infinity | −7.0000 | | |
| S20 | Third reflective member | Infinity | 0.0000 | −1 | |
| S21 | | Infinity | DR3F | | |
| S22 | Filter | Infinity | 0.2100 | 1.519 | 64.2 |
| S23 | | Infinity | 2.1834 | | |
| S24 | Imaging surface | Infinity | | | |

TABLE 10

| | In case of first focal length | In case of second focal length |
|---|---|---|
| R3 | 17.709 | −16.505 |
| D12 | 1.0147 | 1.3824 |
| T2 | 2.1774 | 1.8096 |
| D6R | 3 | 13.9994 |
| DR3F | 6.1990 | 17.1984 |

The definitions of R3, D12, T2, D6R and DR3F may be the same as in the first example.

TABLE 11

| | In case of first focal length | In case of second focal length |
|---|---|---|
| f | 16.8083 | 28.9971 |
| f1 | 127.387693 | 127.387693 |
| f2 | 59.4261745 | −55.38590604 |
| f3 | −7.40568 | −7.40568 |
| f4 | 8.7946 | 8.7946 |
| f5 | −12.01742 | −12.01742 |
| f6 | 8.50535 | 8.50535 |

The definitions of f, f1, f2, f3, f4, f5, and f6 may be the same as those of the first example.

In the third example, the first lens 310 may have positive refractive power, the first surface of the first lens 310 may be concave, and the second surface of the first lens 310 may be convex.

The second lens 320 may be a variable lens of which the focal length may change. For example, the second lens 320 may have a first focal length and a second focal length. The second lens 320 may include a liquid lens 321 and a flat lens 323 attached to an image-side surface of the liquid lens 321.

When the second lens 320 has a first focal length, the second lens 320 may have positive refractive power. Also, the first surface of the second lens 320 (e.g., the object-side surface of the liquid lens 321) may be convex, and the second surface of the second lens 320 (e.g., the image side of the flat lens 323) may be flat.

When the second lens 320 has a second focal length, the second lens 320 may have negative refractive power. Also, the first surface of the second lens 320 may be concave, and the second surface of the second lens 320 may be flat.

The third lens 330 may have negative refractive power, and the first and second surfaces of the third lens 330 may be concave.

The fourth lens 340 may have positive refractive power, the first and second surfaces of the fourth lens 340 may be convex.

The fifth lens 350 may have negative refractive power, the first surface of the fifth lens 350 may be convex, and the second surface of the fifth lens 350 may be concave.

The sixth lens 360 may have positive refractive power, and the first and second surfaces of the sixth lens 360 may be convex.

Each surface of the first lens 310 and the third lens 330 to the sixth lens 360 may have an aspherical coefficient as illustrated in Table 12. For example, the object-side surfaces and the image-side surfaces of the first lens 310 and the third lens 330 to sixth lens 360 may be aspherical.

TABLE 12

| | Conic constant (K) | Fourth coefficient (A) | Sixth coefficient (B) | Eighth coefficient (C) | Tenth coefficient (D) | Twelfth coefficient (E) |
|---|---|---|---|---|---|---|
| S4 | 0 | 0.000966697 | 3.73E−05 | 1.18E−05 | −1.31E−06 | 3.00E−08 |
| S5 | 0 | 0.001076464 | 3.37E−05 | 3.97E−06 | −2.54E−07 | −6.51E−09 |
| S9 | 0 | 0.003884349 | 2.92E−05 | 4.69E−06 | −1.96E−06 | 2.03E−08 |
| S10 | 0 | 0.000156127 | 3.51E−05 | 2.73E−06 | −2.26E−07 | −4.52E−08 |
| S12 | 0 | −0.000928506 | −7.13E−05 | −4.84E−06 | −4.12E−07 | −2.81E−08 |
| S13 | 0 | 0.001521104 | 3.09E−05 | 7.87E−07 | −7.52E−07 | −1.77E−07 |
| S14 | 0 | −2.14E−07 | 7.58E−05 | 5.53E−06 | −1.58E−07 | −9.24E−08 |
| S15 | 0 | −0.000186781 | −6.07E−05 | −6.72E−06 | −5.12E−08 | 6.80E−08 |
| S16 | 0 | −0.000727204 | −4.63E−05 | −3.13E−06 | 3.59E−07 | 1.51E−09 |
| S17 | 0 | −0.000664569 | 2.93E−05 | −7.26E−07 | 1.17E−06 | −9.47E−08 |

Figure 10:
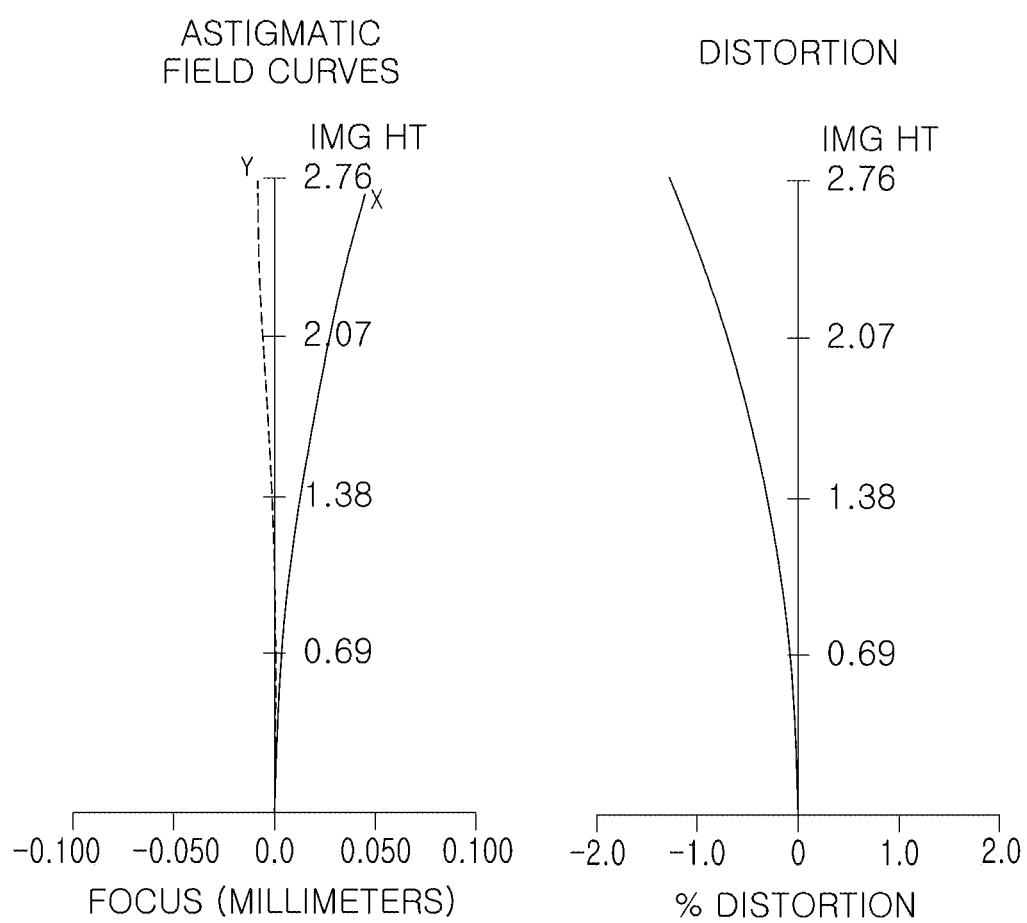
FIG. 10 is a curve indicating aberration properties of the optical imaging system illustrated in FIG. 9.
Figure 12:
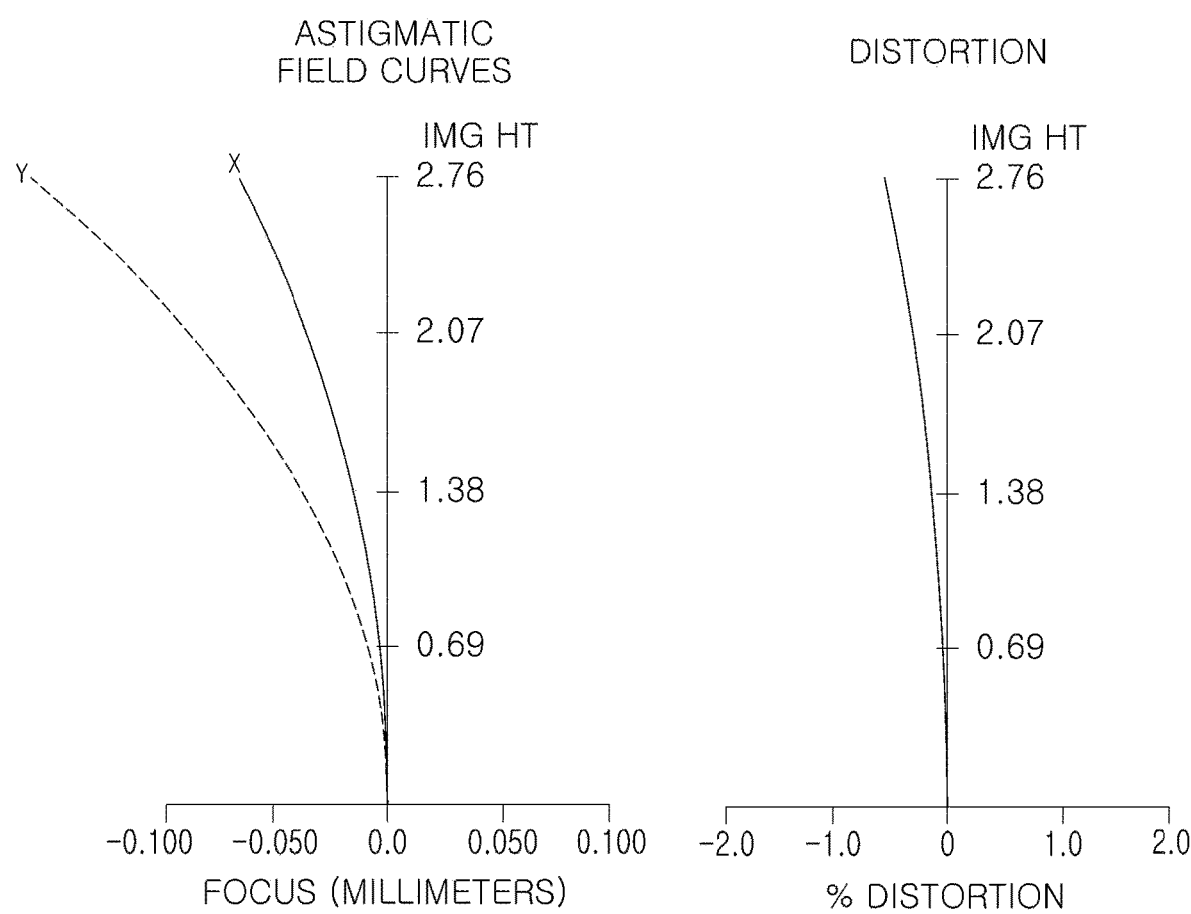
FIG. 12 is a curve indicating aberration properties of the optical imaging system illustrated in FIG. 11.

Also, the optical imaging system configured as described above may have aberration properties illustrated in FIGS. 10 and 12.

A fourth example of the optical imaging system will be described with reference to FIGS. 13 to 16.

Figure 13:
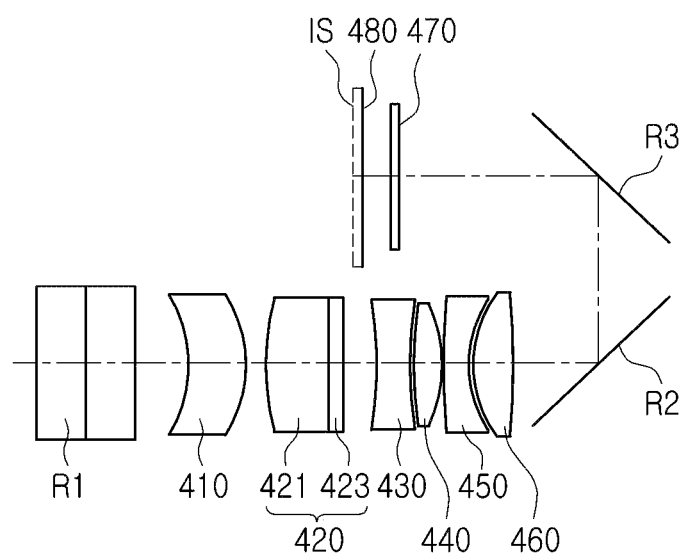
FIG. 13 is diagram illustrating a fourth example in which a first lens group and a second lens group are disposed in a first position in an optical imaging system.
Figure 15:
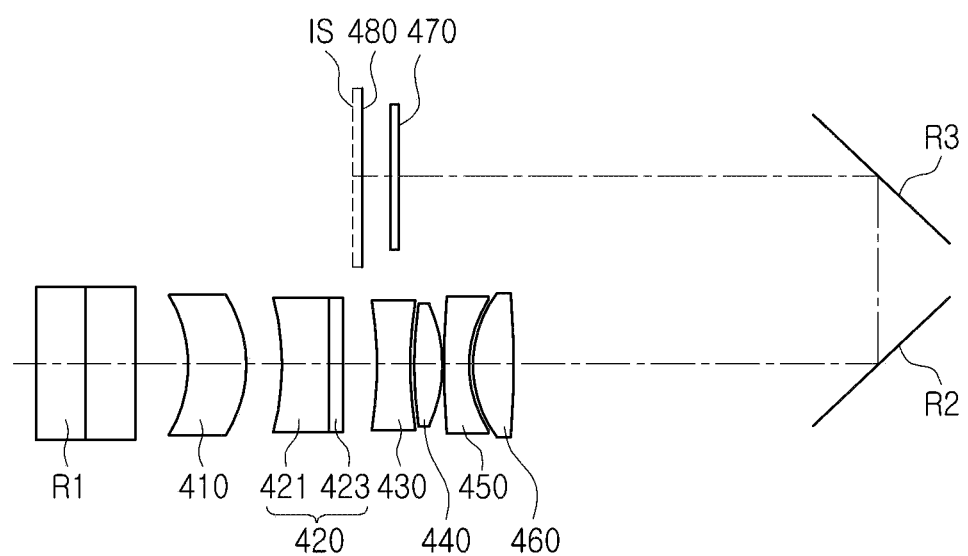
FIG. 15 is a diagram illustrating a fourth example in which a first lens group and a second lens group are disposed in a second position in an optical imaging system.

FIG. 13 is a diagram illustrating a state in which the optical imaging system has a first focal length, and FIG. 15 is a diagram illustrating a state in which the optical imaging system has a second focal length.

The optical imaging system in a fourth example may include a first lens 410, a second lens 420, a third lens 430, a fourth lens 440, a fifth lens 450, and a sixth lens 460.

The optical imaging system in the fourth example may form a focus on an imaging surface 480.

Also, the optical imaging system may further include a filter 470 and an image sensor IS. Also, a stop may be disposed between the third lens 430 and the fourth lens 340.

Also, the optical imaging system may further include a first reflective member R1 disposed on a front side of the first lens 410 and having a reflective surface for changing an optical path. In the fourth example, the first reflective member R1 may be implemented by a prism, or may be provided as a mirror.

In FIGS. 13 and 15, the prism, the first reflective member R1, may have a flat plate shape, but the actual prism may have a triangular columnar shape.

Light incident to the first reflective member R1 may be refracted by the first reflective member R1 and may pass through the first to sixth lenses 410 to 460. For example, light incident to the first reflective member R1 along the first optical axis may be refracted toward a second optical axis perpendicular to the first optical axis.

Also, the optical imaging system may further include a second reflective member R2 and a third reflective member R3 disposed on a rear side of the sixth lens 460 and each having a reflective surface for changing an optical path. The second reflective member R2 and the third reflective member R3 may be disposed between the sixth lens 460 and the image sensor IS.

The second reflective member R2 and the third reflective member R3 may be implemented as mirrors, or may be provided as prisms. Also, as illustrated in FIG. 21, the second reflective member R2 and the third reflective member R3 may be provided in the form of a single prism R2' having two reflective surfaces.

Light passing through the first to sixth lenses 410 to 460 may be refracted by the second reflective member R2. For example, light passing through the first to sixth lenses 410 to 460 may be refracted toward a third optical axis perpendicular to the second optical axis by the second reflective member R2. The second reflective member R2 may have a reflective surface for refracting light to a third optical axis perpendicular to the second optical axis.

Light refracted by the second reflective member R2 may be refracted again by the third reflective member R3. For example, light refracted toward the third optical axis by the second reflective member R2 may be refracted toward the fourth optical axis perpendicular to the third optical axis by the third reflective member R3, and may be received in the image sensor IS. The third reflective member R3 may have a reflective surface for refracting light to a fourth optical axis perpendicular to the third optical axis.

The second optical axis and the fourth optical axis may be parallel to each other.

The filter 470 may be disposed between the third reflective member R3 and the image sensor IS.

At least one of the first to sixth lenses 410 to 460 may be a variable lens having a focal length which may change. For example, the second lens 420 may be a variable lens. The second lens 420 may include a liquid lens 421 and a flat lens 423 attached to an image-side surface of the liquid lens 421.

A radius of curvature and a thickness of the object-side surface of the liquid lens 421 may change. Accordingly, the focal length of the liquid lens 421 may change. The thickness may refer to the thickness on the optical axis.

As the focal length of the second lens 420 changes, the focal length of the optical imaging system may also change.

Even when the first to sixth lenses 410 to 460 are not moved, the focal length of the imaging optical imaging system may change by changing the focal length of the second lens 420, such that the zoom effect may be easily implemented.

Since the focal length of the optical imaging system changes, the second reflective member R2 and the third reflective member R3 may move to form a focus on the imaging surface. For example, as the second reflective member R2 and the third reflective member R3 move, a distance between the sixth lens 460 and the second reflective member R2 may change, and a distance between the third reflective member R3 and the image sensor IS (or the imaging surface 480) may also change.

Here, the "distance" may refer to the distance on the optical axis between the two members.

The second reflective member R2 and the third reflective member R3 may be moved together. Accordingly, a distance on the optical axis between the second reflective member R2 and the third reflective member R3 may not change.

The length of the optical path may change by the movement of the second reflective member R2 and the third reflective member R3.

The first reflective member R1 and the first to sixth lenses 410 to 460 may be fixed members of which positions may be fixed, and the second reflective member R2 and the third reflective member R3 may be movable members of which positions may change.

Characteristics of each lens (a radius of curvature, a thickness of the lens or a distance between lenses, a refractive index, and an Abbe number) may be listed in Table 13.

In Table 13, the refractive indexes of the second reflective member R2 and the third reflective member R3 may be indicated by negative numbers, which may indicate that the second reflective member R2 and the third reflective member R3 may have a reflective surface for reflecting light.

TABLE 13

| Surface No. | Note | Radius of curvature | Thickness or distance | Refractive index | Abbe number |
| --- | --- | --- | --- | --- | --- |
| S1 | First reflective member | Infinity | 2.4500 | 1.7 | 29 |
| S2 | | Infinity | 2.4500 | 1.7 | 29 |
| S3 | | Infinity | 1.9421 | | |
| S4 | First lens | −5.8720 | 2.0000 | 1.671 | 20 |
| S5 | | −6.1970 | D12 | | |
| S6 | Second lens | R3 | T2 | 1.298 | 100 |
| S7 | | Infinity | 0.5000 | 1.526 | 55 |
| S8 | | Infinity | 2.0000 | | |
| S9 | Third lens | −6.8263 | 1.0000 | 1.544 | 56 |
| S10 | | 10.3880 | 0.0941 | | |
| S11 | Stop | Infinity | 0.1000 | | |
| S12 | Fourth lens | 14.3128 | 1.0000 | 1.544 | 56 |
| S13 | | −7.0666 | 0.1000 | | |
| S14 | Fifth lens | 308.4550 | 1.0000 | 1.595 | 31.1 |

TABLE 13-continued

| Surface No. | Note | Radius of curvature | Thickness or distance | Refractive index | Abbe number |
|---|---|---|---|---|---|
| S15 | | 7.1680 | 0.1000 | | |
| S16 | Sixth | 5.9102 | 1.4494 | 1.544 | 56 |
| S17 | lens | −19.9542 | D6R | | |
| S18 | Second reflective member | Infinity | 0.0000 | −1 | |
| S19 | | Infinity | −7.0000 | | |
| S20 | Third reflective member | Infinity | 0.0000 | −1 | |
| S21 | | Infinity | DR3F | | |
| S22 | Filter | Infinity | 0.2100 | 1.519 | 64.2 |
| S23 | | Infinity | 0.901 | | |
| S24 | Imaging surface | Infinity | | | |

TABLE 14

| | In case of first focal length | In case of second focal length |
|---|---|---|
| R3 | 19.55 | −14.52 |
| D12 | 1.0514 | 1.4288 |
| T2 | 2.1605 | 1.7832 |
| D6R | 3 | 14.054 |
| DR3F | 7.3284 | 18.3824 |

The definitions of R3, D12, T2, D6R and DR3F may be the same as in the first example.

TABLE 15

| | In case of first focal length | In case of second focal length |
|---|---|---|
| f | 16.8032 | 29.1086 |
| f1 | 113.20688 | 113.20688 |
| f2 | 65.60402685 | −48.72483221 |
| f3 | −7.419199 | −7.419199 |
| f4 | 8.840524 | 8.840524 |
| f5 | −12.352182 | −12.352182 |
| f6 | 8.549017 | 8.549017 |

The definitions of f, f1, f2, f3, f4, f5, and f6 may be the same as those of the first example.

In the fourth example, the first lens 410 may have positive refractive power, the first surface of the first lens 410 may be concave, and the second surface of the first lens 410 may be convex.

The second lens 420 may be a variable lens of which the focal length may change. For example, the second lens 420 may have a first focal length and a second focal length. The second lens 420 may include a liquid lens 421 and a flat lens 423 attached to an image-side surface of the liquid lens 421.

When the second lens 420 has a first focal length, the second lens 420 may have positive refractive power. Also, the first surface of the second lens 420 (e.g., the object-side surface of the liquid lens 421) may be convex, and the second surface of the second lens 420 (e.g., the image side of the flat lens 423) may be flat.

When the second lens 420 has a second focal length, the second lens 420 may have negative refractive power. Also, the first surface of the second lens 420 may be concave, and the second surface of the second lens 420 may be flat.

The third lens 430 may have negative refractive power, and the first and second surfaces of the third lens 430 may be concave.

The fourth lens 440 may have positive refractive power, the first and second surfaces of the fourth lens 440 may be convex.

The fifth lens 450 may have negative refractive power, the first surface of the fifth lens 450 may be convex, and the second surface of the fifth lens 450 may be concave.

The sixth lens 460 may have positive refractive power, and the first and second surfaces of the sixth lens 460 may be convex.

Each surface of the first lens 410 and the third lens 430 to the sixth lens 460 may have an aspherical coefficient as illustrated in Table 16. For example, the object-side surfaces and the image-side surfaces of the first lens 410 and the third lens 430 to sixth lens 460 may be aspherical.

TABLE 16

| | Conic constant (K) | Fourth coefficient (A) | Sixth coefficient (B) | Eighth coefficient (C) | Tenth coefficient (D) | Twelfth coefficient (E) |
|---|---|---|---|---|---|---|
| S4 | 0 | 0.000652593 | 5.35E−05 | −3.79E−06 | 6.02E−07 | −3.07E−08 |
| S5 | 0 | 0.000813573 | 2.75E−05 | −6.85E−07 | 1.72E−07 | −8.27E−09 |
| S9 | 0 | 0.001658673 | −4.07E−05 | 5.82E−06 | −6.04E−07 | 2.16E−08 |
| S10 | 0 | −0.000244908 | −1.22E−05 | 2.25E−07 | −3.68E−07 | 8.88E−08 |
| S12 | 0 | −0.000306098 | −2.19E−05 | −3.21E−06 | −2.10E−07 | −1.01E−08 |
| S13 | 0 | 0.000438819 | −1.06E−05 | 1.78E−06 | −3.17E−07 | −7.66E−08 |
| S14 | 0 | −1.13E−04 | 2.32E−05 | 5.83E−07 | −1.35E−07 | 2.95E−08 |
| S15 | 0 | −3.06757E−05 | −3.47E−05 | −5.57E−06 | −6.93E−08 | 1.84E−08 |
| S16 | 0 | −0.000336051 | −2.57E−05 | −2.82E−06 | 7.91E−08 | −3.23E−08 |
| S17 | 0 | 5.02056E−06 | 5.45E−05 | −7.66E−06 | 1.59E−06 | −1.21E−07 |

Figure 14:
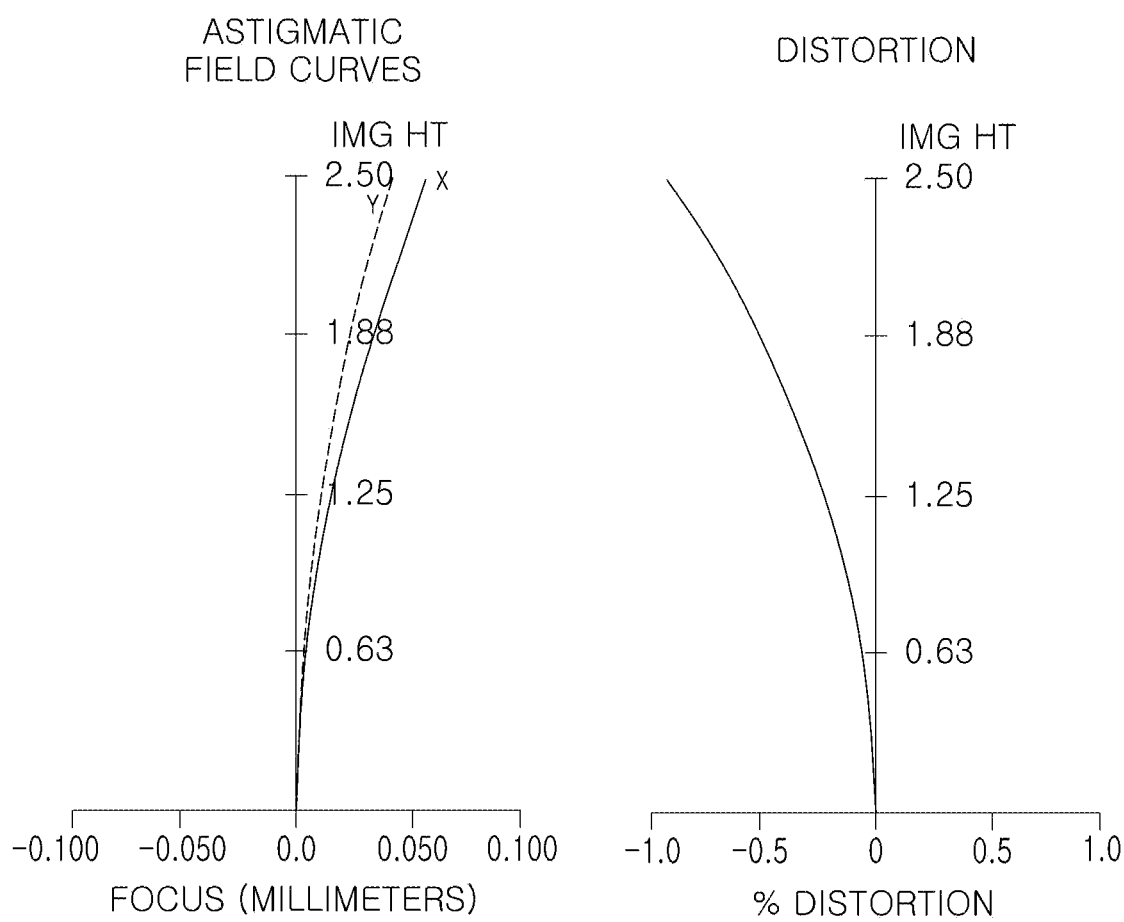
FIG. 14 is a curve indicating aberration properties of the optical imaging system illustrated in FIG. 13.
Figure 16:
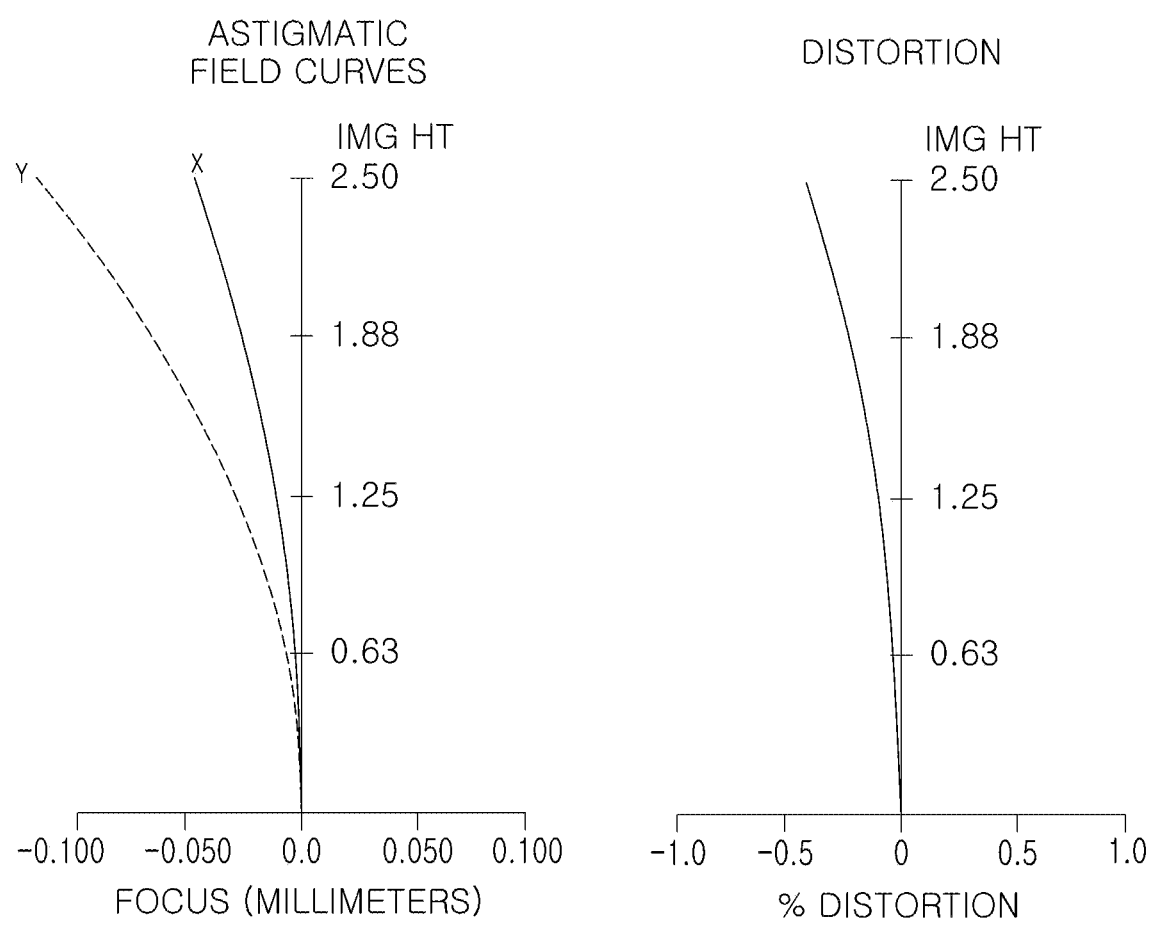
FIG. 16 is a curve indicating aberration properties of the optical imaging system illustrated in FIG. 15.

Also, the optical imaging system configured as described above may have aberration properties as illustrated in FIGS. 14 and 16.

A fifth example of the optical imaging system will be described with reference to FIGS. 17 to 20.

Figure 17:
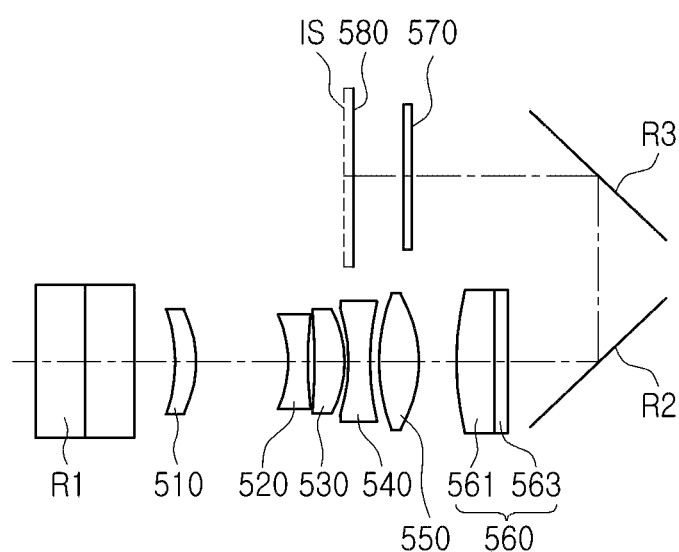
FIG. 17 is a diagram illustrating a fifth example in which a first lens group and a second lens group are disposed in a first position in an optical imaging system.
Figure 19:
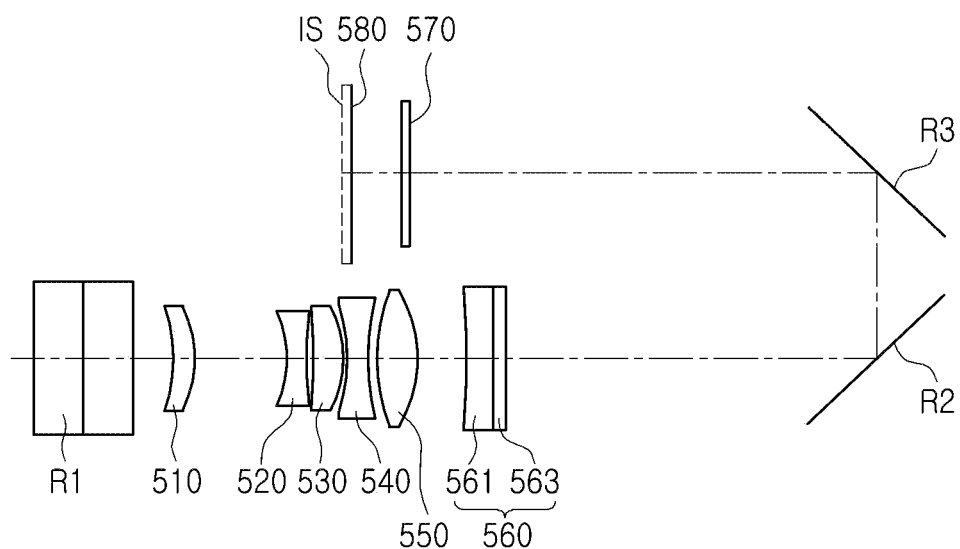
FIG. 19 is a diagram illustrating a fifth example in which a first lens group and a second lens group are disposed in a second position in an optical imaging system.

FIG. 17 is a diagram illustrating a state in which the optical imaging system has a first focal length, and FIG. 19 is a diagram illustrating a state in which the optical imaging system has a second focal length.

The optical imaging system in a fifth example may include a first lens 510, a second lens 520, a third lens 530, a fourth lens 540, a fifth lens 550, and a sixth lens 560.

The optical imaging system in the fifth example may form a focus on an imaging surface 580.

Also, the optical imaging system may further include a filter 570 and an image sensor IS. Also, a stop may be disposed between the third lens 530 and the fourth lens 340.

Also, the optical imaging system may further include a first reflective member R1 disposed on a front side of the first lens 510 and having a reflective surface for changing an optical path. In the fifth example, the first reflective member R1 may be implemented by a prism, or may be provided as a mirror.

In FIGS. 17 and 19, the prism, the first reflective member R1, may have a flat plate shape, but the actual prism may have a triangular columnar shape.

Light incident to the first reflective member R1 may be refracted by the first reflective member R1 and may pass through the first to sixth lenses 510 to 560. For example, light incident to the first reflective member R1 along the first optical axis may be refracted toward a second optical axis perpendicular to the first optical axis.

Also, the optical imaging system may further include a second reflective member R2 and a third reflective member R3 disposed on a rear side of the sixth lens 560 and each having a reflective surface for changing an optical path. The second reflective member R2 and the third reflective member R3 may be disposed between the sixth lens 560 and the image sensor IS.

The second reflective member R2 and the third reflective member R3 may be implemented as mirrors, or may be provided as prisms. Also, as illustrated in FIG. 21, the second reflective member R2 and the third reflective member R3 may be provided in the form of a single prism R2' having two reflective surfaces.

Light passing through the first to sixth lenses 510 to 560 may be refracted by the second reflective member R2. For example, light passing through the first to sixth lenses 510 to 560 may be refracted toward a third optical axis perpendicular to the second optical axis by the second reflective member R2. The second reflective member R2 may have a reflective surface for refracting light to a third optical axis perpendicular to the second optical axis.

Light refracted by the second reflective member R2 may be refracted again by the third reflective member R3. For example, light refracted toward the third optical axis by the second reflective member R2 may be refracted toward the fourth optical axis perpendicular to the third optical axis by the third reflective member R3, and may be received in the image sensor IS. The third reflective member R3 may have a reflective surface for refracting light to a fourth optical axis perpendicular to the third optical axis.

The second optical axis and the fourth optical axis may be parallel to each other.

The filter 570 may be disposed between the third reflective member R3 and the image sensor IS.

At least one of the first to sixth lenses 510 to 560 may be a variable lens having a focal length which may change. For example, the sixth lens 560 may be a variable lens. The sixth lens 560 may include a liquid lens 561 and a flat lens 563 attached to an image-side surface of the liquid lens 561.

A radius of curvature and a thickness of the object-side surface of the liquid lens 561 may change. Accordingly, the focal length of the liquid lens 561 may change. The thickness may refer to the thickness on the optical axis.

As the focal length of the sixth lens 560 changes, the focal length of the optical imaging system may also change.

Even when the first to sixth lenses 510 to 560 are not moved, the focal length of the imaging optical imaging system may change by changing the focal length of the sixth lens 560, such that the zoom effect may be easily implemented.

Since the focal length of the optical imaging system changes, the second reflective member R2 and the third reflective member R3 may move to form a focus on the imaging surface. For example, as the second reflective member R2 and the third reflective member R3 move, a distance between the sixth lens 560 and the second reflective member R2 may change, and a distance between the third reflective member R3 and the image sensor IS (or the imaging surface 580) may also change.

Here, the "distance" may refer to the distance on the optical axis between the two members.

The second reflective member R2 and the third reflective member R3 may be moved together. Accordingly, a distance on the optical axis between the second reflective member R2 and the third reflective member R3 may not change.

The length of the optical path may change by the movement of the second reflective member R2 and the third reflective member R3.

The first reflective member R1 and the first to sixth lenses 510 to 560 may be fixed members of which positions may be fixed, and the second reflective member R2 and the third reflective member R3 may be movable members of which positions may change.

Characteristics of each lens (a radius of curvature, a thickness of the lens or a distance between lenses, a refractive index, and an Abbe number) may be listed in Table 17.

In Table 17, the refractive indexes of the second reflective member R2 and the third reflective member R3 may be indicated by negative numbers, which may indicate that the second reflective member R2 and the third reflective member R3 may have a reflective surface for reflecting light.

TABLE 17

| Surface No. | Note | Radius of curvature | Thickness or distance | Refractive index | Abbe number |
|---|---|---|---|---|---|
| S1 | First reflective member | Infinity | 2.4500 | 1.7 | 29 |
| S2 | | Infinity | 2.4500 | 1.7 | 29 |
| S3 | | Infinity | 1.9420 | | |
| S4 | First lens | −6.8132 | 1.0000 | 1.671 | 20 |
| S5 | | −5.9584 | 4.2926 | | |
| S6 | Second lens | −5.2687 | 1.0000 | 1.544 | 56 |
| S7 | | 19.2779 | 0.1384 | | |
| S8 | Stop | Infinity | 0.1424 | | |
| S9 | Third lens | −23.0600 | 1.4517 | 1.544 | 56 |
| S10 | | −5.3270 | 0.1565 | | |
| S11 | Fourth lens | −8.8103 | 1.0000 | 1.595 | 31.1 |
| S12 | | 12.2400 | 0.3974 | | |
| S13 | Fifth lens | 9.4930 | 1.9278 | 1.544 | 56 |
| S14 | | −6.3940 | D56 | | |
| S15 | Sixth lens | R11 | T6 | 1.298 | 100 |
| S16 | | Infinity | 0.5000 | 1.526 | 55 |
| S17 | | Infinity | D6R | | |
| S18 | Second reflective member | Infinity | 0.0000 | −1 | |
| S19 | | Infinity | −7.0000 | | |
| S20 | Third reflective member | Infinity | 0.0000 | −1 | |
| S21 | | Infinity | DR3F | | |
| S22 | Filter | Infinity | 0.2100 | 1.519 | 64.2 |
| S23 | | Infinity | 1.9631 | | |
| S24 | Imaging surface | Infinity | 0.0000 | | |

TABLE 18

| | In case of first focal length | In case of second focal length |
|---|---|---|
| R11 | 18.5 | −42.86 |
| D56 | 1.7982 | 2.2484 |
| T6 | 1.8151 | 1.3649 |

TABLE 18-continued

|  | In case of first focal length | In case of second focal length |
|---|---|---|
| D6R | 3 | 13.1809 |
| DR3F | 7.5469 | 17.7278 |

R11 is the radius of curvature of the object-side surface of the sixth lens 560, D56 is the distance on the optical axis from the image-side surface of the fifth lens 550 to the object-side surface of the sixth lens 560, T6 is the thickness on the optical axis of the sixth lens 560, D6R is the distance on the optical axis from the image-side surface of the sixth lens 560 to the second reflective member R2, and DR3F is distance on the optical axis between the third reflective member R3 and the filter 570.

TABLE 19

|  | In case of first focal length | In case of second focal length |
|---|---|---|
| f | 16.1726 | 31.755 |
| f1 | 48.216963 | 48.216963 |
| f2 | −7.503543 | −7.503543 |
| f3 | 12.38179 | 12.38179 |
| f4 | −8.47084 | −8.47084 |
| f5 | 7.339655 | 7.339655 |
| f6 | 62.10051479 | −143.871787 |

The definitions of f, f1, f2, f3, f4, f5, and f6 may be the same as those of the first example.

In the fifth example, the first lens 510 may have positive refractive power, the first surface of the first lens 510 may be concave, and the second surface of the first lens 510 may be convex.

The second lens 520 may have negative refractive power, and the first and second surfaces of the second lens 520 may be concave.

The third lens 530 may have positive refractive power, the first surface of the third lens 530 may be concave, and the second surface of the third lens 530 may be convex.

The fourth lens 540 may have negative refractive power, and the first and second surfaces of the fourth lens 540 may be concave.

The fifth lens 550 may have positive refractive power, and the first and second surfaces of the fifth lens 550 may be convex.

The sixth lens 560 may be a variable lens of which a focal length may change. For example, the sixth lens 560 may have a first focal length and a second focal length. The sixth lens 560 may include a liquid lens 561 and a flat lens 563 attached to an image-side surface of the liquid lens 561.

When the sixth lens 560 has the first focal length, the sixth lens 560 may have positive refractive power. Also, the first surface of the sixth lens 560 (e.g., the object-side surface of the liquid lens 561) may be convex, and the second surface of the sixth lens 560 (e.g., the image-side surface of the flat lens 563 may be flat.

When the sixth lens 560 has the second focal length, the sixth lens 560 may have negative refractive power. Also, the first surface of the sixth lens 560 may be concave, and the second surface of the sixth lens 560 may be flat.

Each surface of the first lens 510 to the fifth lens 550 may have an aspherical coefficient as in Table 20. For example, the object-side surfaces and the image-side surfaces of the first to fifth lenses 510 to 550 may be aspherical.

TABLE 20

|  | Conic constant (K) | Fourth coefficient (A) | Sixth coefficient (B) | Eighth coefficient (C) | Tenth coefficient (D) | Twelfth coefficient (E) |
|---|---|---|---|---|---|---|
| S4 | 0 | 0.000635779 | −3.37E−05 | −3.03E−06 | −1.12E−06 | 1.10E−07 |
| S5 | 0 | 0.000954221 | −1.28E−06 | −9.04E−06 | −1.29E−07 | 4.93E−08 |
| S6 | 0 | 0.000729294 | 6.23E−06 | 4.76E−06 | −3.62E−06 | 4.47E−07 |
| S7 | 0 | −2.54065E−05 | −1.60E−05 | 7.30E−07 | 7.67E−07 | 2.38E−07 |
| S9 | 0 | −0.000446111 | −1.80E−05 | −2.82E−06 | −9.16E−07 | 3.34E−08 |
| S10 | 0 | 0.000274266 | −1.60E−05 | −4.55E−07 | −4.24E−07 | −1.59E−07 |
| S11 | 0 | −3.61E−04 | −1.95E−05 | −2.95E−06 | −6.71E−07 | 8.96E−08 |
| S12 | 0 | −7.11911E−06 | −2.15E−05 | −5.05E−06 | 8.04E−08 | −7.97E−09 |
| S13 | 0 | −1.57883E−05 | −3.65E−06 | −1.12E−06 | 5.44E−08 | 3.74E−09 |
| S14 | 0 | 8.26479E−05 | 2.76E−05 | −1.17E−06 | 2.36E−07 | 4.49E−09 |

Figure 18:
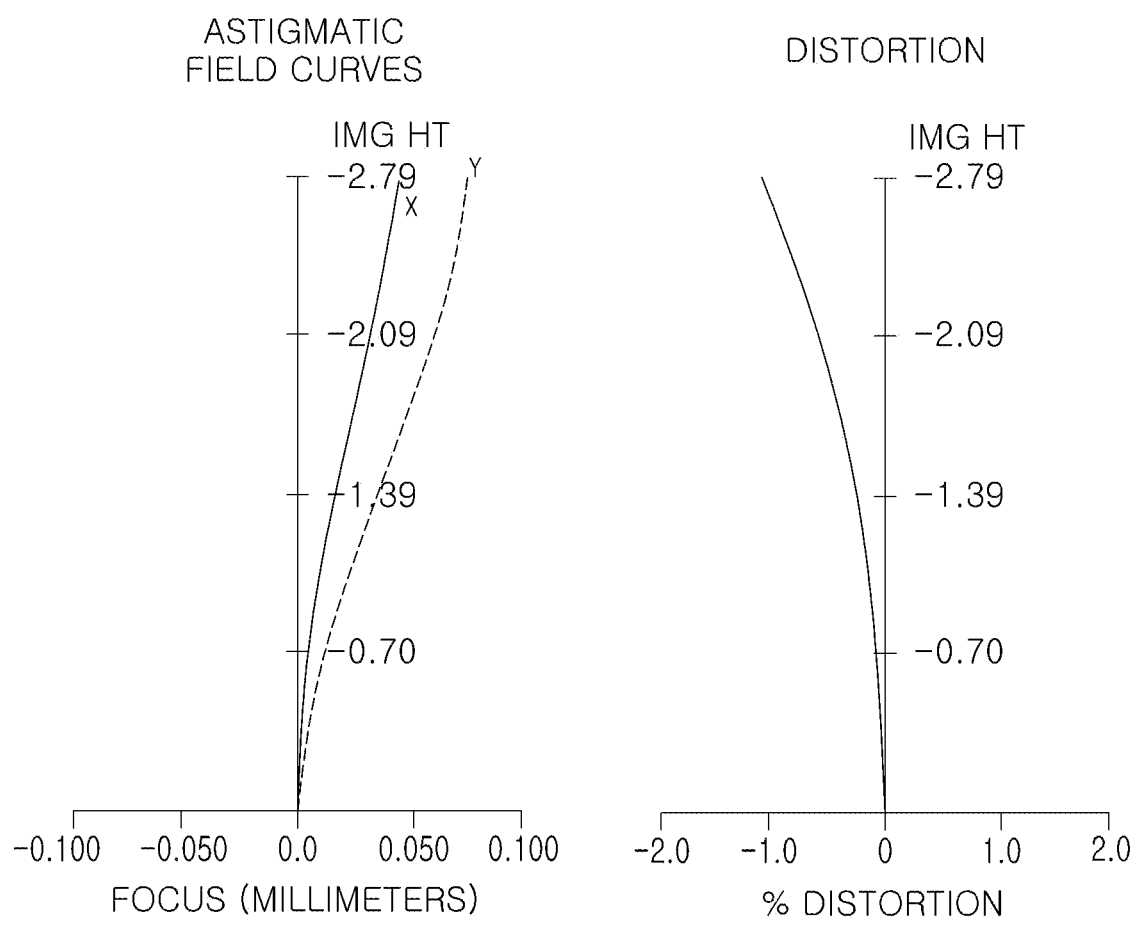
FIG. 18 is a curve indicating aberration properties of the optical imaging system illustrated in FIG. 17.
Figure 20:
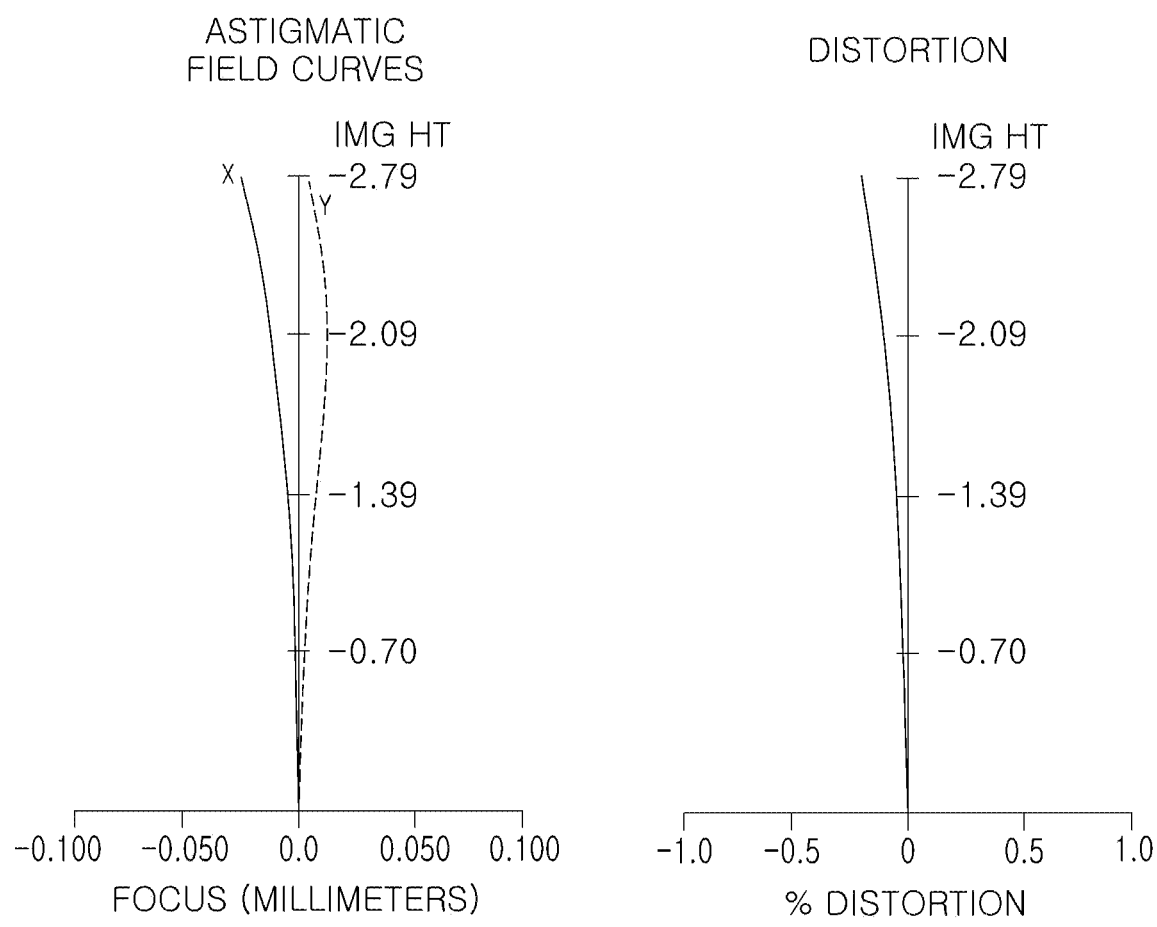
FIG. 20 is a curve indicating aberration properties of the optical imaging system illustrated in FIG. 19.

Also, the optical imaging system configured as described above may have aberration properties illustrated in FIGS. 18 and 20.

According to the aforementioned examples, the optical system may implement a zoom function by changing the focal length.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a plurality of fixed lenses disposed along an optical axis;
   a first reflective member disposed on an object side of the plurality of lenses; and
   a plurality of reflective members disposed on an image side of the plurality of lenses,
   wherein at least one of the plurality of lenses is a variable lens having a variable focal length, wherein each of the plurality of reflective members disposed on the image side of the plurality of lenses is configured to move as the focal length of the variable lens changes, wherein $-7<(fv\_1 \times D6R\_2)/(fv\_2 \times D6R\_1)<-1$, where $fv\_1$ is a first focal length of the variable lens, $fv\_2$ is a second focal length of the variable lens, $D6R\_1$ is a distance on an optical axis from a rearmost lens of the plurality of lenses to a reflective member most adjacent to the rearmost lens among the plurality of reflective members when the variable lens has the first focal length, and $D6R\_2$ is a distance on an optical axis from the rearmost lens to the reflective member most adjacent to the rearmost lens when the variable lens has the second focal length, wherein the plurality of lenses includes a first lens, a second lens, a third lens, a fourth lens, a fifth lens, and a sixth lens disposed in order from the object side, wherein the first to sixth lenses are spaced apart from each other along the optical axis, wherein the optical imaging system has a total of six lenses, and wherein the first lens has positive refractive power and a concave object-side surface in a paraxial region thereof.

2. The optical imaging system of claim 1,
wherein the variable lens is configured to have a first focal length or a second focal length as the focal length changes, and
wherein the first focal length is positive and the second focal length is negative.

3. The optical imaging system of claim 1, wherein the variable lens comprises a liquid lens and a flat lens attached to an image-side surface of the liquid lens.

4. The optical imaging system of claim 3, wherein a radius of curvature of an object-side surface of the liquid lens is variable and a thickness on an optical axis of the liquid lens is variable.

5. The optical imaging system of claim 4,
wherein the variable lens is configured to have a first focal length or a second focal length as the focal length changes, the first focal length is positive, and the second focal length is negative,
wherein, when the variable lens has the first focal length, the radius of curvature of the object-side surface of the liquid lens is positive,
wherein, when the variable lens has the second focal length, the radius of curvature of the object-side surface of the liquid lens is negative, and
wherein the thickness on the optical axis of the liquid lens is smaller when the variable lens has the second focal length than when the variable lens has the first focal length.

6. The optical imaging system of claim 1,
wherein the variable lens is the second lens or the sixth lens.

7. The optical imaging system of claim 1,
wherein the variable lens is the second lens, and
wherein the second lens has positive or negative refractive power, the third lens has negative refractive power, the fourth lens has positive refractive power, the fifth lens has negative refractive power, and the sixth lens has positive refractive power.

8. The optical imaging system of claim 1,
wherein the variable lens is the sixth lens, and
wherein the second lens has negative refractive power, the third lens has positive refractive power, the fourth lens has negative refractive power, the fifth lens has positive refractive power, and the sixth lens has positive or negative refractive power.

9. The optical imaging system of claim 1,
wherein the plurality of reflective members includes a second reflective member and a third reflective member, and
wherein the second reflective member comprises a reflective surface configured to reflect light in a direction perpendicular to an optical axis of the plurality of lenses, and the third reflective member comprises a reflective surface configured to reflect light reflected by the second reflective member in a direction parallel to the optical axis of the plurality of lenses.

10. The optical imaging system of claim 9, wherein the second reflective member and the third reflective member are configured to move together.

11. The optical imaging system of claim 1, wherein $10<fv\_1/D6R\_1$.

12. The optical imaging system of claim 1, wherein $-15<fv\_2/D6R\_2<-3$.

13. The optical imaging system of claim 1, wherein $-3<fv\_2/fv\_1<0$.

14. The optical imaging system of claim 1,
wherein $3<D6R\_2/D6R\_1<6$, and
wherein the first focal length is positive and the second focal length is negative.

15. The optical imaging system of claim 1, wherein $0<L1/TTL1<1$, where L1 is a linear distance in a direction parallel to an optical axis from the object-side surface of the first lens to an imaging surface when the variable lens has a first focal length, and TTL1 is a distance on the optical axis from the object-side surface of the first lens to the imaging surface when the variable lens has the first focal length.

16. The optical imaging system of claim 1, wherein $0<L2/TTL2<1$, where L1 is a linear distance in a direction parallel to an optical axis from the object-side surface of the first lens to an imaging surface when the variable lens has a second focal length, and TTL2 is a distance on the optical axis from the object-side surface of the first lens to the imaging surface when the variable lens has the second focal length.

17. The optical imaging system of claim 1, wherein $1<(L1 \times TTL2)/(L2 \times TTL1)<3$, where L1 is a linear distance in a direction parallel to an optical axis from the object-side surface of the first lens to an imaging surface when the variable lens has a first focal length, L2 is a linear distance in the direction parallel to the optical axis from the object-side surface of the first lens to the imaging surface when the variable lens has a second focal length, TTL1 is a distance on the optical axis from the object-side surface of the first lens to the imaging surface when the variable lens has the first focal length, and TTL2 is a distance on the optical axis from the object-side surface of the first lens to the imaging surface when the variable lens has the second focal length.

* * * * *